United States Patent
Im

(10) Patent No.: US 12,062,067 B2
(45) Date of Patent: Aug. 13, 2024

(54) ARTIFICIALLY INTELLIGENT COMPUTING DEVICE AND REFRIGERATOR CONTROL METHOD USING THE SAME

(71) Applicant: LG ELECTRONICS INC., Seoul (KR)

(72) Inventor: Hyojun Im, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 917 days.

(21) Appl. No.: 17/025,859

(22) Filed: Sep. 18, 2020

(65) Prior Publication Data

US 2021/0166266 A1 Jun. 3, 2021

(30) Foreign Application Priority Data

Dec. 2, 2019 (KR) .................. 10-2019-0158317

(51) Int. Cl.
  *F25D 29/00* (2006.01)
  *G06Q 10/087* (2023.01)
  (Continued)

(52) U.S. Cl.
  CPC ......... *G06Q 30/0254* (2013.01); *F25D 29/00* (2013.01); *G06Q 10/087* (2013.01);
  (Continued)

(58) Field of Classification Search
  CPC ... F25D 29/00; F25D 2500/06; G06T 7/0004; G06T 7/11; G06T 11/60;
  (Continued)

(56) References Cited

U.S. PATENT DOCUMENTS

2004/0035123 A1* 2/2004 Kim .................. F25D 29/00
 236/51
2006/0237427 A1* 10/2006 Logan .................. G07C 9/37
 219/401
(Continued)

OTHER PUBLICATIONS

KR 2014-0065636 (English translation) (Year: 2014).*

*Primary Examiner* — Jonathan Bradford
(74) *Attorney, Agent, or Firm* — LEE, HONG, DEGERMAN, KANG & WAIMEY

(57) ABSTRACT

A method for controlling a refrigerator performed by an artificial intelligence computing device may include photographing a food material stored inside of the refrigerator; comparing the photographed image with a preconfigured previous image, and transmitting storage information of the food material to a cloud according to a comparison result; learning the transmitted storage information of the food; determining a stock state of the food material based on the learned storage information of the food material; and determining whether to transmit relation information related to the food material depending on the determined stock state of the food material. One or more of the artificial intelligence computing device according to the present disclosure may be linked with an Artificial Intelligence module, a drone (Unmanned Aerial Vehicle, UAV), a robot, an Augmented Reality (AR) device, a virtual reality (VR) device, a device related to 5G service, and the like.

17 Claims, 21 Drawing Sheets

(51) Int. Cl.
  *G06Q 30/02* (2023.01)
  *G06Q 30/0251* (2023.01)
  *G06Q 30/0273* (2023.01)
  *G06T 7/00* (2017.01)
  *G06T 7/11* (2017.01)
  *G06T 11/60* (2006.01)
  *G06V 10/44* (2022.01)
  *G06V 10/764* (2022.01)
  *G06V 10/82* (2022.01)
  *G06V 10/94* (2022.01)
  *G06V 20/20* (2022.01)
  *H04L 12/28* (2006.01)
  *H04N 7/18* (2006.01)
  *G06V 20/68* (2022.01)

(52) U.S. Cl.
  CPC ....... *G06Q 30/0273* (2013.01); *G06T 7/0004* (2013.01); *G06T 7/11* (2017.01); *G06T 11/60* (2013.01); *G06V 10/454* (2022.01); *G06V 10/764* (2022.01); *G06V 10/765* (2022.01); *G06V 10/82* (2022.01); *G06V 10/95* (2022.01); *G06V 20/20* (2022.01); *H04L 12/2825* (2013.01); *H04N 7/188* (2013.01); *F25D 2500/06* (2013.01); *G06T 2207/20081* (2013.01); *G06T 2207/20084* (2013.01); *G06T 2207/30128* (2013.01); *G06T 2207/30242* (2013.01); *G06V 20/68* (2022.01); *H04L 2012/2841* (2013.01); *H04L 2012/285* (2013.01)

(58) Field of Classification Search
  CPC . G06T 2207/20081; G06T 2207/20084; G06T 2207/30128; G06T 2207/30242; G06Q 10/087; G06Q 30/0273; H04L 12/2825; H04L 2012/2841; H04L 2012/285; H04N 7/188
  See application file for complete search history.

(56) References Cited

U.S. PATENT DOCUMENTS

| | | | |
|---|---|---|---|
| 2010/0170289 A1* | 7/2010 | Graziano | F25D 23/02 62/449 |
| 2017/0219276 A1* | 8/2017 | Wang | H04N 23/90 |
| 2019/0094981 A1* | 3/2019 | Bradski | H04N 21/414 |
| 2019/0182345 A1* | 6/2019 | Ji | H04L 67/55 |

* cited by examiner

```
divide the inside of the refrigerator into at least     — S321
one area and photograph each of the divided areas
                        ↓
synthesize the photographing images into a single whole image — S322
```

ARTIFICIALLY INTELLIGENT COMPUTING DEVICE AND REFRIGERATOR CONTROL METHOD USING THE SAME

CROSS REFERENCE TO RELATED APPLICATION(S)

Pursuant to 35 U.S.C. § 119(a), this application claims the benefit of earlier filing date and right of priority to Korean Patent Application No. 10-2019-0158317, filed on Dec. 2, 2019, the contents of which are hereby incorporated by reference herein in its entirety.

BACKGROUND OF THE INVENTION

Field of the Invention

The present disclosure relates to an artificial intelligence computing device and a method for controlling a refrigerator using the same, and more particularly, to an artificial intelligence computing device and a method for controlling a refrigerator using the same that photographs a food material whenever a door of the refrigerator is opened and closed, transmits an image of the photographed food material to a cloud, and can make a profit by selling it to exterior.

Related Art

Generally, a refrigerator is a device used for storing a storage such as food, beverage, and the like freshly for long time and stores a storage to be frozen or refrigerated according to type of the storage.

A storage or food material stored in a refrigerator may be a data for inferring or predicting a consumption habit for a food as well as an eating habit of a person.

Such a data may be the best information for identifying a correlation between the eating habit of a person and health and may be information which can be utilized in food manufacture and food distribution.

However, until now, the data for storage or food material stored in a refrigerator has not been utilized.

Furthermore, recently, a manufacturer of a refrigerator collects various data by mounting Wi-Fi in various home appliance products, but the collected data is not connected to sales or profit.

SUMMARY OF THE INVENTION

The disclosure aims to address the foregoing issues and/or needs.

The present disclosure also provides an artificial intelligence computing device and a method for controlling a refrigerator using the same that can utilize data for storage or food material stored in a refrigerator obtained through the refrigerator installed in a home as a research material for health and generate a profit for a person or a refrigerator manufacturer.

In an aspect, a method for controlling a refrigerator performed by an artificial intelligence computing device may include photographing a food material stored inside of the refrigerator; comparing the photographed image with a preconfigured previous image, and transmitting storage information of the food material to a cloud according to a comparison result; learning the transmitted storage information of the food; determining a stock state of the food material based on the learned storage information of the food material; and determining whether to transmit relation information related to the food material depending on the determined stock state of the food material.

Furthermore, the method may further include storing or modifying information of a user in the refrigerator, before the step of photographing the food material.

Furthermore, the step of photographing the food material may include partitioning the inside of the refrigerator into at least one area and photographing each of the partitioned area; and synthesizing each of the photographed area into a whole image.

Furthermore, the step of transmitting storage information of the food material may include: comparing the photographed image with the preconfigured previous image; when the previous image is different from the photographed image as a result of the comparison, obtaining the storage information of the food material based on it; and transmitting the obtained storage information of the food material to the cloud.

Furthermore, the cloud may be configured to display the transmitted storage information of the food material by sorting the storage information for each user, and when the displayed storage information of the food material is sold, transmit a sales profit money for the storage information of the food material to the refrigerator.

Furthermore, the step of determining a stock state of the food material based on the learned storage information of the food may include: extracting feature values from the storage information of the food material; inputting the feature values in an artificial neural network (ANN) sorter to identify the stock state of the food material; and determining the stock state of the food material based on an output of the ANN.

Furthermore, the feature values may be values that distinguish the stock state of the food material.

Furthermore, the storage information of the food material may include at least one of: a motion count of the food material, a change of amount for the food material, a storage period for the food material, a category of the food material and a package of the food material.

Furthermore, the step of determining whether to transmit the relation information may include when the determined food material is in stock state, transmitting the relation information to at least one of: the cloud, a preconfigured smart device or a server.

Furthermore, the step of determining whether to transmit the relation information may include receiving an advertisement corresponding to the relation information from the cloud or the server.

Furthermore, the cloud or the server may be configured to estimate an advertisement profit money by counting a time when the advertisement is displayed on the refrigerator, and to transmit the estimated advertisement profit money to the refrigerator.

Furthermore, the method may further include receiving Downlink Control Information (DCI) used for scheduling a transmission of the storage information of the food material obtained from a camera from a network, wherein the storage information of the food material is transmitted to the network based on the DCI.

Furthermore, the method may further include performing an initial access process with the network based on Synchronization signal block (SSB), wherein the storage information of the food material is transmitted to the network through a PUSCH, and wherein the SSB and a DM-RS of the PUSCH are QCLed with respect to QCL type D.

Furthermore, the method may further include controlling a transceiver to transmit the storage information of the food material to an AI processor included in the network; and controlling the transceiver to receive AI processed information from the AI processor, wherein the AI processed information is information of determining the stock state of the food material.

In another aspect, an artificial intelligence computing device for controlling a refrigerator according to an embodiment of the present disclosure may include a camera provided in the refrigerator, a processor and a memory for storing a command executable by the processor, the processor controls the refrigerator to: photograph a food material stored inside of the refrigerator by controlling the camera; compare the photographed image with a preconfigured previous image, and transmit storage information of the food material to a cloud according to a comparison result; learn the transmitted storage information of the food; determine a stock state of the food material based on the learned storage information of the food material; and determine whether to transmit relation information related to the food material depending on the determined stock state of the food material.

Furthermore, the processor may be configured to partition the inside of the refrigerator into at least one area, and photograph each of the partitioned area; and synthesize each of the photographed area into a whole image.

Furthermore, the processor may be configured to compare the photographed image with the preconfigured previous image, when the previous image is different from the photographed image as a result of the comparison, obtain the storage information of the food material based on it; and transmit the obtained storage information of the food material to the cloud.

Furthermore, the cloud may be configured to display the transmitted storage information of the food material by sorting the storage information for each user, and when the displayed storage information of the food material is sold, transmit a sales profit money for the storage information of the food material to the refrigerator.

Furthermore, the processor may be configured to extract feature values from the storage information of the food, input the feature values in an artificial neural network (ANN) sorter to identify the stock state of the food material, and determine the stock state of the food material based on an output of the ANN, wherein the feature values are values that distinguish the stock state of the food material.

The storage information of the food material may include at least one of a motion count of the food material, a change of amount for the food material, a storage period for the food material, a category of the food material and a package of the food material.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein:

FIG. 9 is a diagram for describing another example of a method for controlling a refrigerator according to an embodiment of the present disclosure.

DESCRIPTION OF EXEMPLARY EMBODIMENTS

Figure 1:
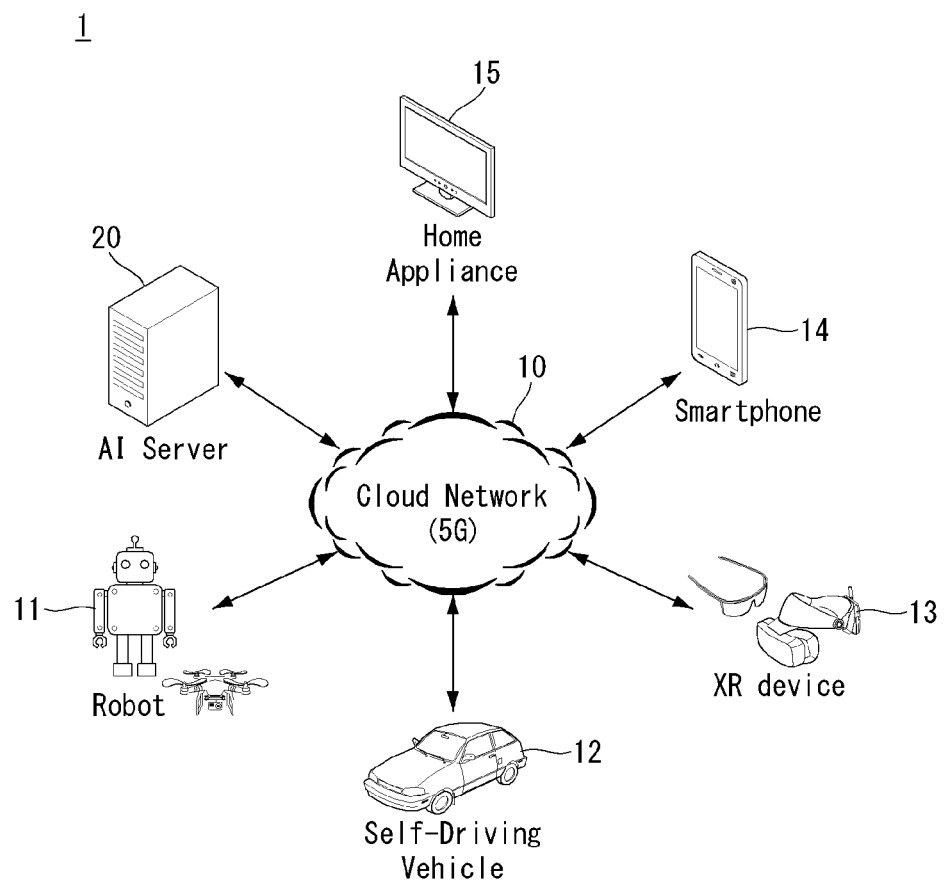
FIG. 1 is a conceptual diagram illustrating an embodiment of an AI device.

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereinafter, 5G communication (5th generation mobile communication) required by an apparatus requiring AI processed information and/or an AI processor will be described through paragraphs A through G.

Three major requirement areas of 5G include (1) an enhanced mobile broadband (eMBB) area, (2) a massive machine type communication (mMTC) area, and (3) ultra-reliable and low latency communications (URLLC) area.

Some use cases may require multiple areas for optimization, and other use cases may be focused to only one key performance indicator (KPI). 5G supports these various use cases in a flexible and reliable manner.

The EMBB enables far beyond basic mobile Internet access and covers media and entertainment applications in rich interactive work, cloud or augmented reality. Data is one of key dynamic power of 5G, and in a 5G era, a dedicated voice service may not be seen for the first time. In 5G, a voice is expected to be treated as an application program using data connection simply provided by a communication system. Main reasons for an increased traffic volume are increase in content size and increase in the number of applications requiring a high data transmission rate. Streaming services (audio and video), interactive video, and mobile Internet connections will be used more widely as more devices connect to Internet. These many application programs require always-on connectivity in order to push real-time information and notifications to a user. Cloud storage and applications are growing rapidly in mobile communication platforms, which may be applied to both work and entertainment. Cloud storage is a special use case that drives growth of uplink data transmission rates. 5G is also used for remote tasks in cloud and requires much lower end-to-end delays so as to maintain excellent user experience when tactile interfaces are used. Entertainment, for example, cloud gaming and video streaming is another key factor in increasing the need for mobile broadband capabilities. Entertainment is essential in smartphones and tablets at anywhere including in high mobility environments such as trains, cars and airplanes. Another use case is augmented reality and information search for entertainment. Here, augmented reality requires very low latency and instantaneous amount of data.

Further, one of most anticipated 5G use cases relates to a function, i.e., mMTC that can smoothly connect embedded sensors in all fields. By 2020 year, potential IoT devices are expected to reach 20.4 billion. Industrial IoT is one of areas in which 5G plays a major role in enabling smart cities, asset tracking, smart utilities, and agriculture and security infrastructure.

URLLC includes new services to transform an industry through ultra-reliable/available low latency links, such as remote control of major infrastructure and self-driving vehicles. A level of reliability and latency is essential for smart grid control, industrial automation, robotics, drone control, and coordination.

Hereinafter, a number of use cases are described in more detail.

5G may complement fiber-to-the-home (FTTH) and cable-based broadband (or DOCSIS) as a means of providing streams that are rated at hundreds of megabits per second to gigabits per second. Such a high speed is required to deliver televisions with a resolution of 4K or more (6K, 8K, and more) as well as virtual reality and augmented reality. Virtual Reality (VR) and Augmented Reality (AR) applications include nearly immersive sporting events. A specific application program may require a special network setting. For example, for VR games, in order to minimize latency, game companies may need to integrate core servers with an edge network server of a network operator.

An automotive is expected to become important new dynamic power for 5G together with many use cases for mobile communication to vehicles. For example, entertainment for passengers requires simultaneous high capacity and high mobility mobile broadband. This is because future users continue to expect high quality connections regardless of a position and speed thereof. Another use case of an automotive sector is an augmented reality dashboard. This identifies objects in the dark above what a driver views through a front window and overlays and displays information that notifies the driver about a distance and movement of the object. In the future, wireless modules enable communication between vehicles, exchange of information between a vehicle and a supporting infrastructure, and exchange of information between a vehicle and other connected devices (e.g., devices carried by pedestrians). A safety system guides alternative courses of an action to enable drivers to safer drive, thereby reducing the risk of an accident. The next step will be a remotely controlled or self-driven vehicle. This requires very reliable and very fast communication between different self-driving vehicles and between automobiles and infrastructure. In the future, self-driving vehicles will perform all driving activities and the driver will focus on traffic anomalies that the vehicle itself cannot identify. The technical requirements of self-driving vehicles require ultra-low latency and ultra-fast reliability so as to increase traffic safety to an unachievable level.

Smart cities and smart homes, referred to as smart societies, will be embedded in a high density wireless sensor network. A distributed network of intelligent sensors will identify conditions for a cost and energy-efficient maintenance of a city or a home. Similar settings may be made for each family. Temperature sensors, window and heating controllers, burglar alarms and home appliances are all connected wirelessly. These many sensors are typically low data rates, low power and low cost. However, for example, real-time HD video may be required in a specific type of device for surveillance.

Consumption and distribution of energy including a heat or a gas is highly decentralized, thereby requiring automated control of distributed sensor networks. Smart grids interconnect these sensors using digital information and communication technology so as to collect information and act accordingly. The information may include a behavior of suppliers and consumers, allowing smart grids to improve distribution of fuels such as electricity in efficiency, reliability, economics, sustainability of production, and in an automated manner. Smart grid may be viewed as another sensor network with low latency.

A health sector has many application programs that can benefit from mobile communication. The communication system may support telemedicine that provides clinical care at a far distance. This may help reduce barriers to distance and improve access to healthcare services that are not consistently available in remote rural areas. It is also used for saving lives in important care and emergency situations. A mobile communication based wireless sensor network may provide remote monitoring and sensors for parameters such as a heart rate and a blood pressure.

Wireless and mobile communication is becoming gradually important in an industrial application field. A wiring requires a highly installing and maintaining cost. Therefore, the possibility of replacing with a wireless link that can reconfigure a cable is an attractive opportunity in many industry fields. However, achieving this requires that a wireless connection operates with reliability, capacity, and delay similar to a cable and that management is simplified. Low latency and very low error probability are new requirements that need to be connected in 5G.

Logistics and freight tracking are important use cases for mobile communication that enable tracking of inventory and packages at anywhere using a position-based information system. A use case of logistics and freight tracking typically requires a low data rate, but requires reliable position information and a wide range.

The present disclosure to be described later in the present disclosure may be implemented by combining or changing each embodiment so as to satisfy the requirements of the above-described 5G.

FIG. 1 is a conceptual diagram illustrating an embodiment of an AI device.

Referring to FIG. 1, in an AI system, at least one of an AI server 20, a robot 11, an autonomous vehicle 12, an XR device 13, a smartphone 14, or a home appliance 15 is connected to a cloud network 10. Here, the robot 11, the autonomous vehicle 12, the XR device 13, the smartphone 14, or the home appliance 15 to which AI technology is applied may be referred to as AI devices 11 to 15.

The cloud network 10 may mean a network that configures part of a cloud computing infrastructure or that exists inside a cloud computing infrastructure. Here, the cloud network 10 may be configured using a 3G network, a 4G network, a long term evolution (LTE) network, or a 5G network.

That is, each device 11 to 15 and 20 constituting the AI system may be connected to each other through the cloud network 10. In particular, each of the devices 11 to 15 and 20 may communicate with each other through a base station, but may directly communicate with each other without passing through a base station.

The AI server 20 may include a server that performs AI processing and a server that performs operations on big data.

The AI server 20 may be connected to at least one of the robot 11, the autonomous vehicle 12, the XR device 13, the smartphone 14, or the home appliance 15, which are AI devices constituting the AI system through the cloud network 10 and may help at least some of AI processing of the connected AI devices 11 to 15.

In this case, the AI server 20 may learn an artificial neural network according to machine learning algorithm instead of the AI devices 11 to 15 and directly store a learning model or transmit a learning model to the AI devices 11 to 15.

In this case, the AI server 20 may receive input data from the AI devices 11 to 15, infer a result value of the input data received using a learning model, and generate a response or a control command based on the inferred result value to transmit the response or the control command to the AI device 11 and 15.

Alternatively, the AI devices 11 to 15 may directly infer a result value of the input data using a learning model and generate a response or a control command based on the inferred result value.

<AI+Robot>

AI technology is applied to the robot 11, and the robot 11 may be implemented into a guide robot, a transport robot, a cleaning robot, a wearable robot, an entertainment robot, a pet robot, an unmanned aerial robot, or the like.

The robot 11 may include a robot control module for controlling an operation, and the robot control module may mean a software module or a chip implemented in hardware.

The robot 11 may obtain status information of the robot 11 using sensor information obtained from various kinds of sensors, detect (recognize) a surrounding environment and an object, generate map data, determine a moving route and a driving plan, determine a response to a user interaction, or determine an operation.

Here, in order to determine a movement route and a driving plan, the robot 11 may use sensor information obtained from a sensor of at least one of rider, radar, and a camera.

The robot 11 may perform the above operation using a learning model configured with at least of one artificial neural network. For example, the robot 11 may recognize a surrounding environment and an object using a learning model, and determine an operation using the recognized surrounding environment information or object information. Here, the learning model may be directly learned by the robot 11 or may be learned by an external device such as the AI server 20.

In this case, by generating a result directly using a learning model, the robot 11 may perform an operation, but may transmit sensor information to an external device such as the AI server 20 and receive the generated result and perform an operation.

The robot 11 may determine a movement route and a driving plan using at least one of map data, object information detected from sensor information, or object information obtained from an external device, and control a driver to drive the robot 11 according to the determined movement route and driving plan.

The map data may include object identification information about various objects disposed in a space in which the robot 11 moves. For example, the map data may include object identification information about fixed objects such as walls and doors and movable objects such as flower pots and desks. The object identification information may include a name, a kind, a distance, and a position.

Further, by controlling the driver based on the control/interaction of a user, the robot 11 may perform an operation or may drive. In this case, the robot 11 may obtain intention information of an interaction according to the user's motion or voice utterance, and determine a response based on the obtained intention information to perform an operation.

<AI+Autonomous Vehicle>

AI technology is applied to the autonomous vehicle 12 and thus the autonomous vehicle 12 may be implemented into a mobile robot, a vehicle, an unmanned aerial vehicle, or the like.

The autonomous vehicle 12 may include an autonomous driving control module for controlling an autonomous driving function, and the autonomous driving control module may mean a software module or a chip implemented in hardware. The autonomous driving control module may be included inside the autonomous vehicle 12 as a configuration of the autonomous vehicle 12, but may be configured as a separate hardware to be connected to the outside of the autonomous vehicle 12.

The autonomous vehicle 12 may obtain status information thereof using sensor information obtained from various types of sensors, detect (recognize) a surrounding environment and object, generate map data, determine a moving route and a driving plan, or determine an operation.

Here, in order to determine a movement route and a driving plan, the autonomous vehicle 12 may use sensor information obtained from a sensor of at least one of rider, radar, and a camera, similar to the robot 11.

In particular, the autonomous vehicle 12 may recognize an environment or an object about an area in which a field of view is covered or an area of a predetermined distance or more by receiving sensor information from external devices or may directly receive recognized information from external devices.

The autonomous vehicle 12 may perform the above-described operations using a learning model configured with at least one artificial neural network. For example, the autonomous vehicle 12 may recognize a surrounding environment and an object using a learning model, and determine a driving route using the recognized surrounding environment information or object information. Here, the learning model may be learned directly from the autonomous vehicle 12 or may be learned from an external device such as the AI server 20.

In this case, by generating a result directly using a learning model, the autonomous vehicle 12 may perform an operation, but transmit sensor information to an external device such as the AI server 20 and thus receive the generated result to perform an operation.

The autonomous vehicle 12 may determine a moving route and a driving plan using at least one of map data, object information detected from sensor information, or object information obtained from an external device, and controls the driver to drive the autonomous vehicle 12 according to the determined moving route and driving plan.

The map data may include object identification information about various objects disposed in a space (e.g., road) in which the autonomous vehicle 12 drives. For example, the map data may include object identification information about fixed objects such as street lights, rocks, buildings, and movable objects such as vehicles and pedestrians. The object identification information may include a name, a kind, a distance, a position, and the like.

Further, by controlling the driver based on a user's control/interaction, the autonomous vehicle 12 may perform an operation or may drive. In this case, the autonomous vehicle 12 may obtain intention information of an interaction according to the user's motion or voice utterance, and determine a response based on the obtained intention information to perform an operation.

<AI+XR>

AI technology is applied to the XR device 13 and thus the XR device 13 may be implemented into a head-mount display (HMD), a head-up display (HUD) installed in a vehicle, a television, a mobile phone, a smartphone, a computer, a wearable device, a home appliance, digital signage, a vehicle, a fixed robot, or a mobile robot.

The XR device 13 may analyze three-dimensional point cloud data or image data obtained through various sensors or from an external device to generate position data and attribute data of the three-dimensional points, thereby obtaining information about a surrounding space or a reality object and rendering and outputting an XR object to output. For example, the XR device 13 may output an XR object including additional information about the recognized object to correspond to the recognized object.

The XR device 13 may perform the above-described operations using a learning model configured with at least one artificial neural network. For example, the XR device 13 may recognize a real object in 3D point cloud data or image data using the learning model, and provide information corresponding to the recognized real object. Here, the learning model may be learned directly from the XR device 13 or may be learned from an external device such as the AI server 20.

In this case, by generating a result directly using a learning model, the XR device 13 may perform an operation, but transmit sensor information to an external device such as the AI server 20 and receive the generated result to perform an operation.

<AI+Robot+Autonomous Driving>

AI technology and autonomous driving technology are applied to the robot 11 and thus the robot 11 may be implemented into a guide robot, a transport robot, a cleaning robot, a wearable robot, an entertainment robot, a pet robot, an unmanned aerial robot, or the like.

The robot 11 to which AI technology and autonomous driving technology are applied may mean a robot having an autonomous driving function or a robot 11 interacting with the autonomous vehicle 12.

The robot 11 having an autonomous driving function may be collectively referred to as devices that moves by themselves according to a given moving route without a user's control or that determine and move a moving route by themselves.

In order to determine at least one of a movement route or a driving plan, the robot 11 and the autonomous vehicle 12 having an autonomous driving function may use a common sensing method. For example, the robot 11 and the autonomous vehicle 12 having the autonomous driving function may determine at least one of a movement route or a driving plan using information sensed through lidar, radar, and the camera.

While the robot 11 interacting with the autonomous vehicle 12 exists separately from the autonomous vehicle 12, the robot 11 may be linked to an autonomous driving function inside or outside the autonomous vehicle 12 or may perform an operation connected to a user who rides in the autonomous vehicle 12.

In this case, the robot 11 interacting with the autonomous vehicle 12 may obtain sensor information instead of the autonomous vehicle 12 to provide the sensor information to the autonomous vehicle 12 or may obtain sensor information and generate surrounding environment information or object information to provide the surrounding environment information or the object information to the autonomous vehicle 12, thereby controlling or assisting an autonomous driving function of the autonomous vehicle 12.

Alternatively, the robot 11 interacting with the autonomous vehicle 12 may monitor a user who rides in the autonomous vehicle 12 or may control a function of the autonomous vehicle 12 through an interaction with the user. For example, when it is determined that a driver is in a drowsy state, the robot 11 may activate an autonomous driving function of the autonomous vehicle 12 or assist the control of the driver of the autonomous vehicle 12. Here, the function of the autonomous vehicle 12 controlled by the robot 11 may include a function provided by a navigation system or an audio system provided inside the autonomous vehicle 12 as well as an autonomous driving function.

Alternatively, the robot 11 interacting with the autonomous vehicle 12 may provide information from the outside of the autonomous vehicle 12 to the autonomous vehicle 12 or assist a function of the autonomous vehicle 12. For example, the robot 11 may provide traffic information including signal information to the autonomous vehicle 12 as in a smart traffic light and interact with the autonomous vehicle 12 to automatically connect an electric charger to a charging port, as in an automatic electric charger of an electric vehicle.

<AI+Robot+XR>

AI technology and XR technology are applied to the robot 11, and the robot 11 may be implemented into a guide robot, a transport robot, a cleaning robot, a wearable robot, an entertainment robot, a pet robot, an unmanned aerial robot, a drone, or the like.

The robot 11 to which the XR technology is applied may mean a robot to be an object of control/interaction in an XR image. In this case, the robot 11 may be distinguished from the XR device 13 and be interworked with the XR device 13.

When the robot 11 to be an object of control/interaction in the XR image obtains sensor information from sensors including a camera, the robot 11 or the XR device 13 generates an XR image based on the sensor information, and the XR device 13 may output the generated XR image. The robot 11 may operate based on a control signal input through the XR device 13 or a user interaction.

For example, the user may check an XR image corresponding to a viewpoint of the robot 11 remotely linked through an external device such as the XR device 13, and adjust an autonomous driving route of the robot 11 through an interaction, control an operation or driving of the robot 11, or check information of a surrounding object.

<AI+Autonomous Vehicle+XR>

AI technology and XR technology are applied to the autonomous vehicle 12, and the autonomous vehicle 12 may be implemented into a mobile robot, a vehicle, an unmanned aerial vehicle, and the like.

The autonomous vehicle 12 to which XR technology is applied may mean an autonomous vehicle having a means for providing an XR image or an autonomous vehicle to be an object of control/interaction in the XR image. In particular, the autonomous vehicle 12 to be an object of control/interaction in the XR image may be distinguished from the XR device 13 and be interworked with the XR device 13.

The autonomous vehicle 12 having a means for providing an XR image may obtain sensor information from sensors including a camera, and output an XR image generated based on the obtained sensor information. For example, by having an HUD and outputting an XR image, the autonomous vehicle 12 may provide an XR object corresponding to a real object or an object on a screen to an occupant.

In this case, when the XR object is output to the HUD, at least a part of the XR object may be output to overlap with the actual object to which the occupant's eyes are directed.

However, when the XR object is output to the display provided inside the autonomous vehicle 12, at least a part of the XR object may be output to overlap with an object on the screen. For example, the autonomous vehicle 12 may output XR objects corresponding to objects such as a road, another vehicle, a traffic light, a traffic sign, a motorcycle, a pedestrian, a building, and the like.

When the autonomous vehicle 12 to be an object of control/interaction in the XR image obtains sensor information from sensors including a camera, the autonomous vehicle 12 or the XR device 13 may generate an XR image based on the sensor information, and the XR device 13 may output the generated XR image. The autonomous vehicle 12 may operate based on a user's interaction or a control signal input through an external device such as the XR device 13.

[EXtended Reality (XR) Technology]

EXtended Reality (XR) collectively refers to Virtual Reality (VR), Augmented Reality (AR), and Mixed Reality (MR). VR technology is computer graphic technology that provides an object or a background of a real world only to CG images, AR technology is computer graphic technology that together provides virtual CG images on real object images, and MR technology is computer graphic technology that provides by mixing and combining virtual objects in a real world.

MR technology is similar to AR technology in that it shows both a real object and a virtual object. However, there is a difference in that in AR technology, a virtual object is used in the form of supplementing a real object, but in MR technology, a virtual object and a real object are used in an equivalent nature.

XR technology may be applied to a Head-Mount Display (HMD), a Head-Up Display (HUD), a mobile phone, a tablet PC, a laptop computer, a desktop computer, a television, digital signage, etc. and a device to which XR technology is applied may be referred to an XR device.

A. Example of Block Diagram of UE and 5G Network

Figure 2:
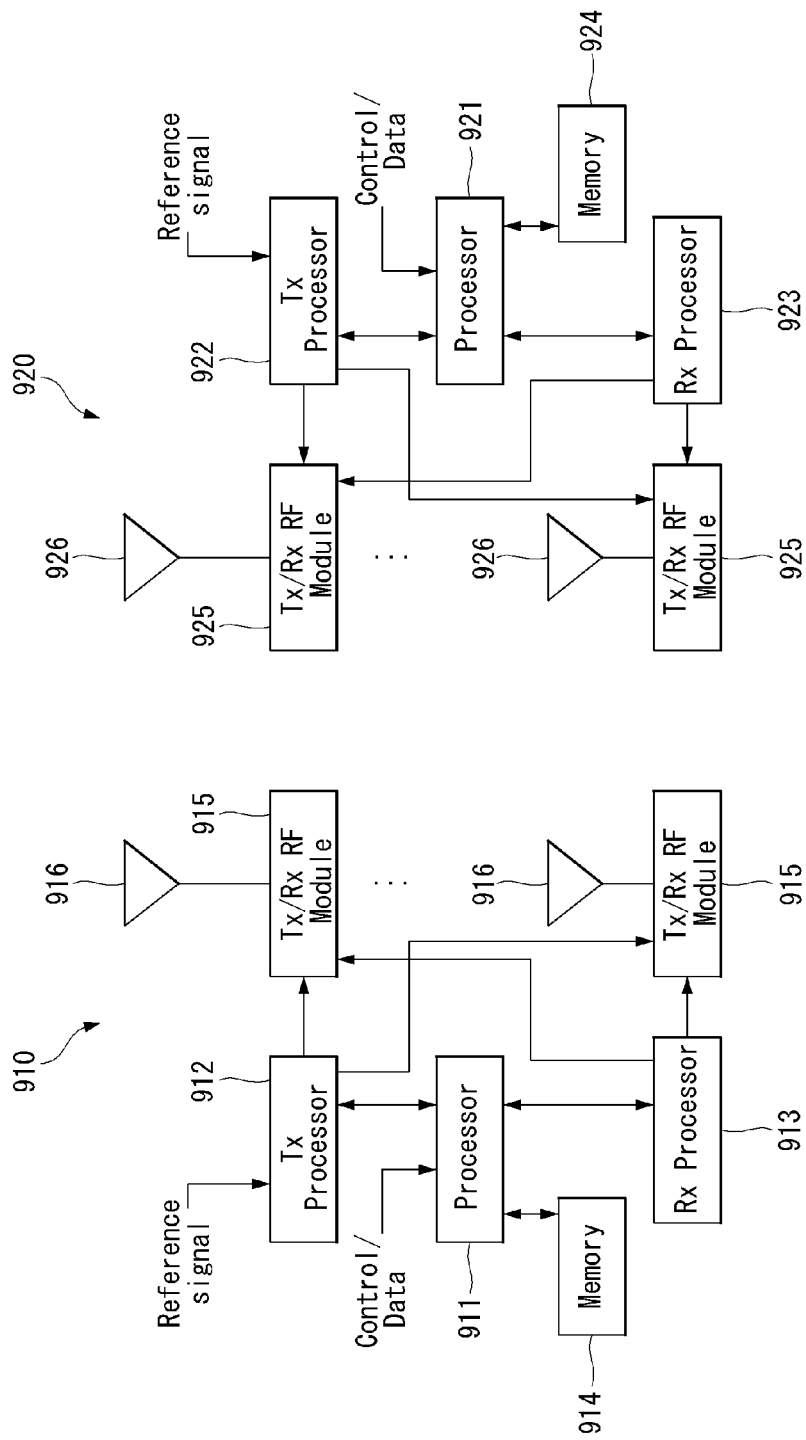
FIG. 2 illustrates a block diagram of a wireless communication system to which the methods proposed in the present disclosure may be applied.

FIG. 2 is a block diagram of a wireless communication system to which methods proposed in the disclosure are applicable.

Referring to FIG. 2, a device (AI device) including an AI module is defined as a first communication device (910), and a processor 911 can perform detailed autonomous operations.

A 5G network including another device (AI server) communicating with the AI device is defined as a second communication device (920), and a processor 921 can perform detailed autonomous operations.

The 5G network may be represented as the first communication device and the AI device may be represented as the second communication device.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 2, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

According to an embodiment of the present disclosure, the first communication device may be an intelligent electronic device, and the second communication device may be a 5G network.

B. Signal Transmission/Reception Method in Wireless Communication System

Figure 3:
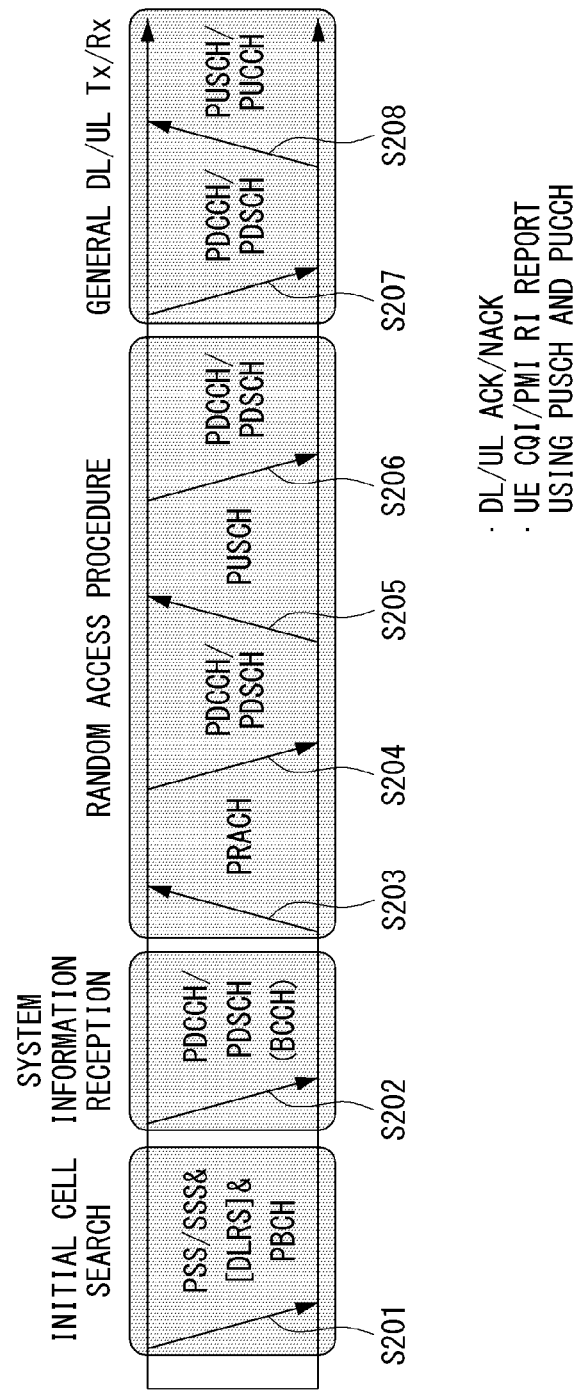
FIG. 3 illustrates an example of a signal transmission/reception method in a wireless communication system.

FIG. 3 is a diagram showing an example of a signal transmission/reception method in a wireless communication system.

In a wireless communication system, a UE receives information from a base station through downlink (DL), and the UE transmits information to the base station through uplink (UL). The information transmitted and received by the base station and the UE includes data and various control information, and various physical channels exist according to a kind/use of information in which the base station and the UE transmit and receive.

When power of the UE is turned on or when the UE newly enters to a cell, the UE performs an initial cell search operation of synchronizing with the base station (S201). For this reason, the UE may receive a primary synchronization signal (PSS) and a secondary synchronization signal (SSS) from the base station to be synchronized with the base station and obtain information such as cell ID. Thereafter, the UE may receive a physical broadcast channel (PBCH) from the base station to obtain broadcast information within the cell. The UE may receive a downlink reference signal (DL RS) in an initial cell search step to check a downlink channel status.

The UE, having finished initial cell search may receive a physical downlink shared channel (PDSCH) according to a physical downlink control channel (PDCCH) and information loaded in the PDCCH to obtain more specific system information (S202).

When the UE first accesses to the base station or when there is no radio resource for signal transmission, the UE may perform a random access procedure (RACH) to the base station (S203 to S206). For this reason, the UE may transmit a specific sequence to a preamble through a physical random access channel (PRACH) (S203 and S205) and receive a random access response (RAR) message to the preamble through the PDCCH and the PDSCH corresponding thereto. In the case of a contention-based RACH, the UE may additionally perform a contention resolution procedure (S206).

The UE, having performed the above process may perform PDCCH/PDSCH reception (S207) and physical uplink shared channel (PUSCH)/physical uplink control channel (PUCCH) transmission (S208) as a general uplink/downlink signal transmission procedure. In particular, the UE receives downlink control information (DCI) through the PDCCH. Here, the DCI includes control information such as resource allocation information for the UE and may be applied in different formats according to a use purpose.

Control information transmitted by the UE to the base station through uplink or received by the UE from the base station may include a downlink/uplink ACK/NACK signal, a channel quality indicator (CQI), a precoding matrix index (PMI), and a rank indicator (RI). The UE may transmit control information such as the above-described CQI/PMI/RI through a PUSCH and/or a PUCCH.

The UE monitors a set of PDCCH candidates at monitoring occasions set to at least one control element sets (CORESETs) on a serving cell according to the corresponding search space configurations. A set of PDCCH candidates to be monitored by the UE is defined in terms of search space sets, and the search space sets may be a common search space set or a UE-specific search space set. The CORESET is configured with a set of (physical) resource blocks having time duration of 1 to 3 OFDM symbols. The network may set the UE to have a plurality of CORESETs. The UE monitors PDCCH candidates in at least one search space sets. Here, monitoring means attempting to decode the PDCCH candidate(s) in the search space. When the UE succeeds in decoding one of PDCCH candidates in a search space, the UE determines that the PDCCH has been detected in the corresponding PDCCH candidate, and performs PDSCH reception or PUSCH transmission based on DCI in the detected PDCCH. The PDCCH may be used for scheduling DL transmissions on the PDSCH and UL transmissions on the PUSCH. Here, DCI on the PDCCH includes a downlink assignment (i.e., downlink grant (DL grant)) including at least modulation and coding format and resource allocation information related to a downlink shared channel or uplink grant (UL grant) including modulation and coding format and resource allocation information related to an uplink shared channel.

An initial access (IA) procedure in a 5G communication system will be additionally described with reference to FIG. 3.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 3.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

A UE receives a CSI-ResourceConfig IE including CSI-SSB-ResourceSetList for SSB resources used for BM from a BS. The RRC parameter "csi-SSB-Resource-SetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.

The UE receives the signals on SSB resources from the BS on the basis of the CSI-SSB-ResourceSetList.

When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

The UE receives an NZP CSI-RS resource set IE including an RRC parameter with respect to 'repetition' from a BS through RRC signaling. Here, the RRC parameter 'repetition' is set to 'ON'.

The UE repeatedly receives signals on resources in a CSI-RS resource set in which the RRC parameter 'repetition' is set to 'ON' in different OFDM symbols through the same Tx beam (or DL spatial domain transmission filters) of the BS.

The UE determines an RX beam thereof.

The UE skips a CSI report. That is, the UE can skip a CSI report when the RRC parameter 'repetition' is set to 'ON'.

Next, the Tx beam determination procedure of a BS will be described.

A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.

The UE receives signals on resources in a CSI-RS resource set in which the RRC parameter 'repetition' is set to 'OFF' in different DL spatial domain transmission filters of the BS.

The UE selects (or determines) a best beam.

The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to "beam management" from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation of AI Using 5G Communication

Figure 4:
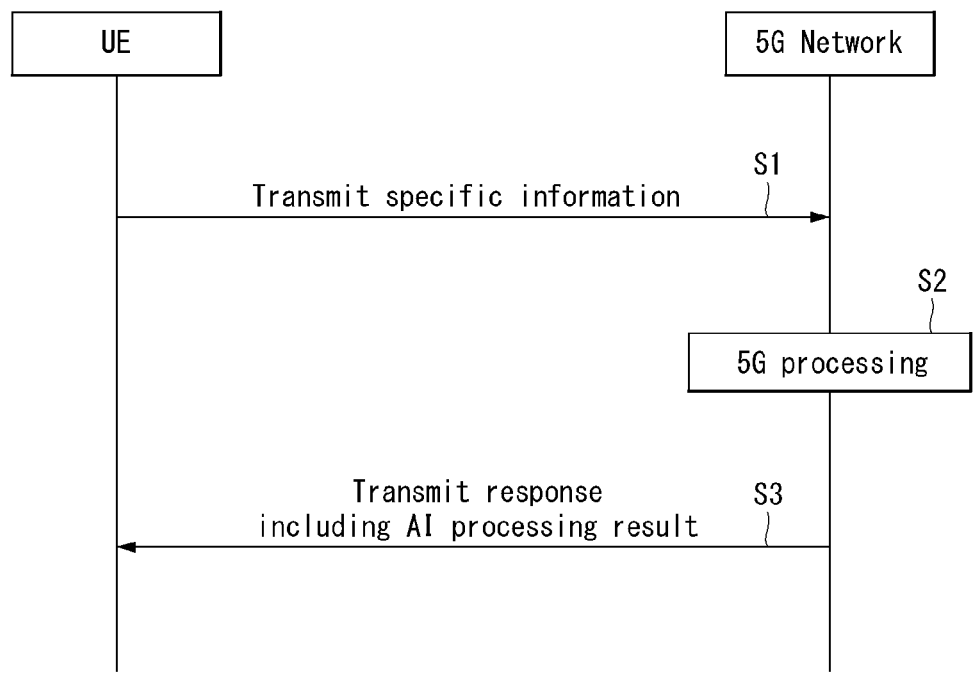
FIG. 4 illustrates an example of a basic operation of a user equipment and a 5G network in a 5G communication system.

FIG. 4 shows an example of basic operations of an UE and a 5G network in a 5G communication system.

The UE transmits specific information to the 5G network (S1). The 5G network may perform 5G processing related to the specific information (S2). Here, the 5G processing may include AI processing. And the 5G network may transmit response including AI processing result to UE (S3).

G. Applied Operations Between UE and 5G network in 5G Communication System

Hereinafter, the operation of an AI using 5G communication will be described in more detail with reference to wireless communication technology (BM procedure, URLLC, mMTC, etc.) described in FIGS. 2 and 3.

First, a basic procedure of an applied operation to which a method proposed by the present disclosure which will be described later and eMBB of 5G communication are applied will be described.

As in steps S1 and S3 of FIG. 4, the UE performs an initial access procedure and a random access procedure with the 5G network prior to step S1 of FIG. 4 in order to transmit/receive signals, information and the like to/from the 5G network.

More specifically, the UE performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the UE receives a signal from the 5G network.

In addition, the UE performs a random access procedure with the 5G network for UL synchronization acquisition and/or UL transmission. The 5G network can transmit, to the UE, a UL grant for scheduling transmission of specific information. Accordingly, the UE transmits the specific information to the 5G network on the basis of the UL grant. In addition, the 5G network transmits, to the UE, a DL grant for scheduling transmission of 5G processing results with respect to the specific information. Accordingly, the 5G network can transmit, to the UE, information (or a signal) related to remote control on the basis of the DL grant.

Next, a basic procedure of an applied operation to which a method proposed by the present disclosure which will be described later and URLLC of 5G communication are applied will be described.

As described above, an UE can receive DownlinkPreemption IE from the 5G network after the UE performs an initial access procedure and/or a random access procedure with the 5G network. Then, the UE receives DCI format 2_1 including a preemption indication from the 5G network on the basis of DownlinkPreemption IE. The UE does not perform (or expect or assume) reception of eMBB data in resources (PRBs and/or OFDM symbols) indicated by the preemption indication. Thereafter, when the UE needs to transmit specific information, the UE can receive a UL grant from the 5G network.

Next, a basic procedure of an applied operation to which a method proposed by the present disclosure which will be described later and mMTC of 5G communication are applied will be described.

Description will focus on parts in the steps of FIG. 4 which are changed according to application of mMTC.

In step S1 of FIG. 4, the UE receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the UE transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present disclosure which will be described later and applied or can complement the methods proposed in the present disclosure to make technical features of the methods concrete and clear.

Figure 5:
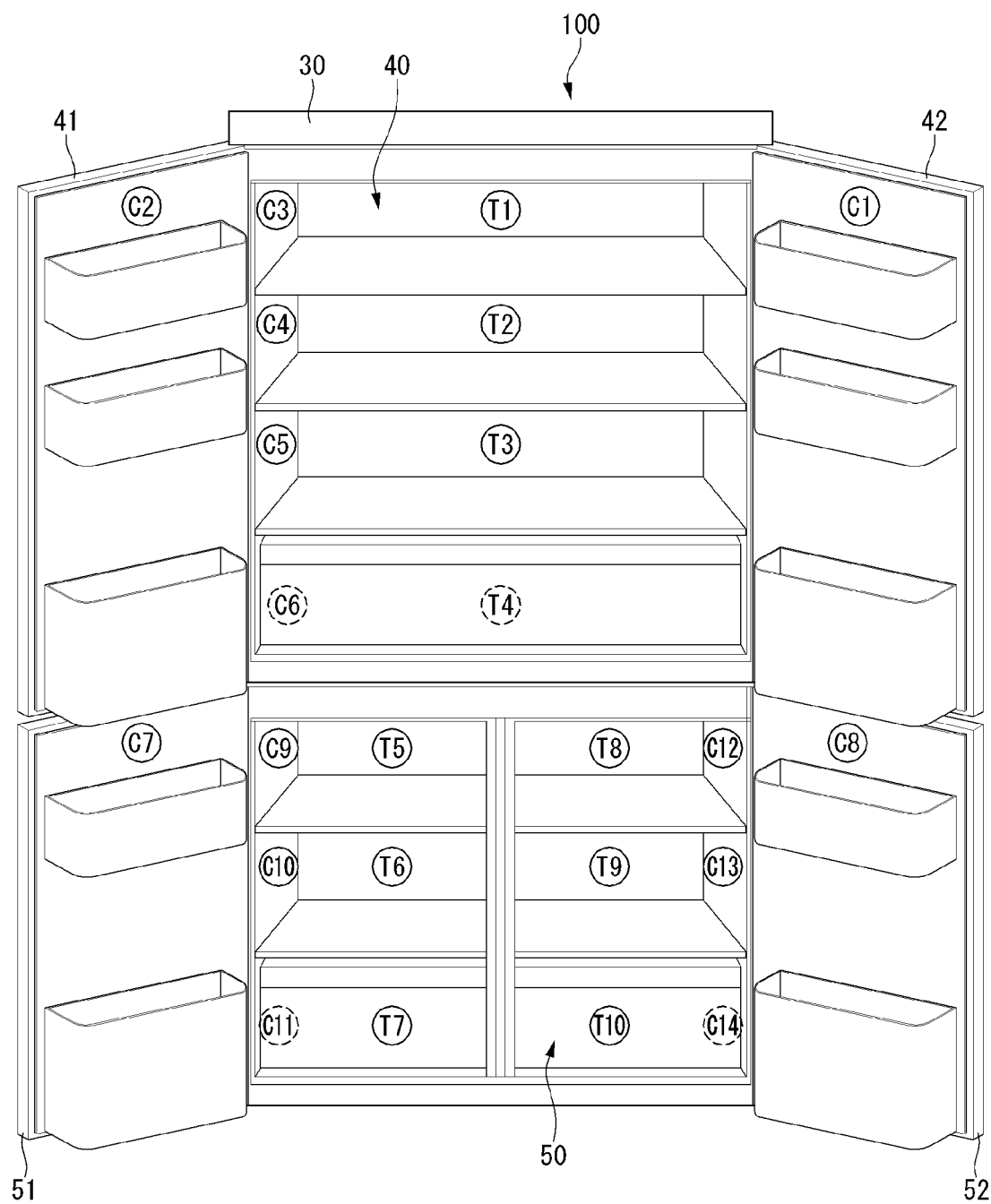
FIG. 5 is a diagram for describing an artificial intelligence refrigerating device according to an embodiment of the present disclosure.

FIG. 5 is a diagram for describing an artificial intelligence refrigerating device according to an embodiment of the present disclosure.

Referring to FIG. 5, an artificial intelligence refrigerating device 100 according to an embodiment of the present disclosure may include a refrigerator body 30 provided with a refrigerating compartment 40 and a freezing compartment 50, refrigerating compartment doors 41 and 42 for opening and closing the refrigerating compartment 40 of the body 30 and freezing compartment doors 51 and 52 for opening and closing the freezing compartment 50. The artificial intelligence refrigerating device 100 may be referred to as an intelligent refrigerator. The refrigerating compartment doors 41 and 42 may include a left door 41 and a right door 42 of the refrigerating compartment 40. The freezing compartment doors 51 and 52 may include a left door 51 and a right door 52 of the freezing compartment 50.

The intelligent refrigerator 100 may be provided with at least one sensor 160. The at least one sensor 160 may include photographing sensors C1 to C14 and temperature sensors T1 to T9.

At least one of the photographing sensors C1 to C14 may be mounted in the intelligent refrigerator 100. The photographing sensors C1 to C14 may photograph a food material stored in the intelligent refrigerator 100. For example, the photographing sensors C1 to C14 may photograph an inside of the intelligent refrigerator 100 when a door is closed or opened and may photograph a food material.

For example, the photographing sensors C1 to C14 may be disposed close to a top side of the doors 41, 42, 51 and 52 of the intelligent refrigerator 100, and when the doors 41, 42, 51 and 52 of the intelligent refrigerator 100 enter within a preconfigured angle range, may sense it, and photograph a food material by photographing the inside of the intelligent refrigerator 100.

At least one of the photographing sensors C1 to C14 may be disposed for each predetermined area and may generate a photographed image that photographs the disposed predetermined area. The photographing sensors C1 to C14 will be described below in detail.

At least one of the temperature sensors T1 to T9 may be mounted in the intelligent refrigerator 100. The temperature sensors T1 to T9 may sense an inside temperature of the refrigerating compartment and the freezing compartment. For example, the temperature sensors T1 to T9 may include refrigerating compartment temperature sensors T1 to T4 that sense a temperature of the refrigerating compartment 40 and freezing compartment temperature sensors T5 to T9 that sense a temperature of the freezing compartment 50. For example, at least one of the refrigerating compartment temperature sensors T1 to T4 may be disposed in the refrigerating compartment 40. The refrigerating compartment temperature sensors T1 to T4 may be disposed with being spaced apart with each other. For example, at least one of the freezing compartment temperature sensors T5 to T9 may be disposed in the freezing compartment 50. The freezing compartment temperature sensors T5 to T9 may be disposed with being spaced apart with each other.

In addition, although it is now shown, the intelligent refrigerator 100 may include a refrigerator processor (not shown) electrically connected with the photographing sensors C1 to C14 and the temperature sensors T1 to T9.

Figure 6:
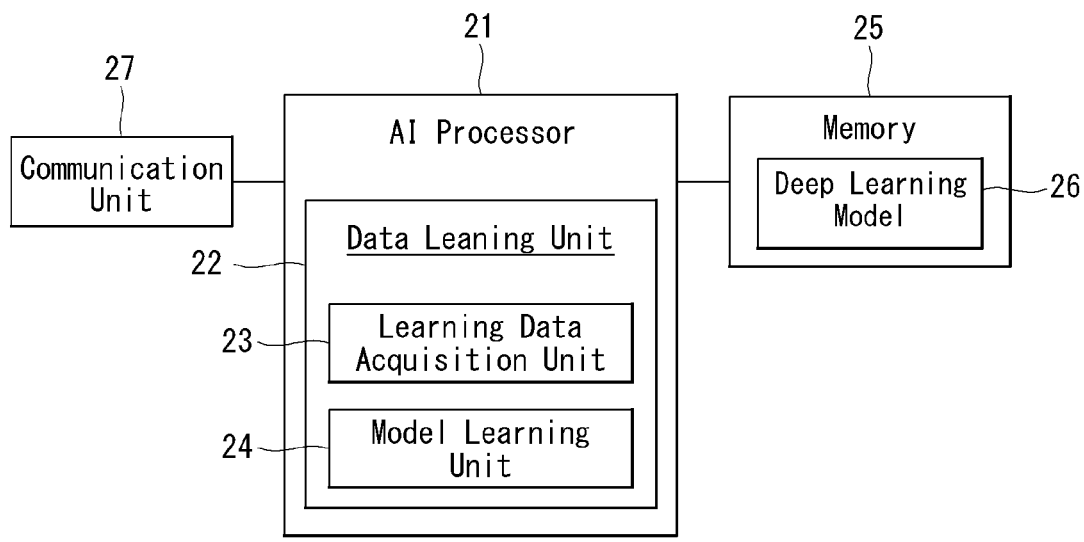
FIG. 6 is a block diagram of an AI device according to an embodiment of the present disclosure.

FIG. 6 is a block diagram of an AI device in accordance with the embodiment of the present disclosure.

The AI device 20 may include electronic equipment that includes an AI module to perform AI processing or a server that includes the AI module. Furthermore, the AI device 20 may be included in at least a portion of the intelligent refrigerator 100, and may be provided to perform at least some of the AI processing.

The AI processing may include all operations related to the function of the intelligent refrigerator 100. For example, the intelligent refrigerator may AI-process sensing data or travel data to perform processing/determining and a control-signal generating operation.

Furthermore, for example, the intelligent refrigerator 100 may process data obtained through an interaction with the other electronic device provided in the refrigerator and may perform an operation of processing/determining and generating a control signal.

The AI device 20 may include an AI processor 21, a memory 25 and/or a communication unit 27.

The AI device 20 may be a computing device capable of learning a neural network, and may be implemented as various electronic devices such as a server, a desktop PC, a laptop PC or a tablet PC.

The AI processor 21 may learn the neural network using a program stored in the memory 25. Particularly, the AI processor 21 may learn the neural network for recognizing data related to the intelligent refrigerator 100. Here, the neural network for recognizing data related to the intelligent refrigerator 100 may be designed to simulate a human brain structure on the computer, and may include a plurality of network nodes having weights that simulate the neurons of the human neural network. The plurality of network nodes may exchange data according to the connecting relationship to simulate the synaptic action of neurons in which the neurons exchange signals through synapses. Here, the neural network may include the deep learning model developed from the neural network model. While the plurality of network nodes is located at different layers in the deep learning model, the nodes may exchange data according to the convolution connecting relationship. Examples of the neural network model include various deep learning techniques, such as a deep neural network (DNN), a convolution neural network (CNN), a recurrent neural network (RNN, Recurrent Boltzmann Machine), a restricted Boltzmann machine (RBM,), a deep belief network (DBN) or a deep Q-Network, and may be applied to fields such as computer vision, voice recognition, natural language processing, voice/signal processing or the like.

Meanwhile, the processor performing the above-described function may be a general-purpose processor (e.g. CPU), but may be an AI dedicated processor (e.g. GPU) for artificial intelligence learning.

The memory 25 may store various programs and data required to operate the AI device 20. The memory 25 may be implemented as a non-volatile memory, a volatile memory, a flash memory), a hard disk drive (HDD) or a solid state drive (SDD). The memory 25 may be accessed by the AI processor 21, and reading/writing/correcting/deleting/update of data by the AI processor 21 may be performed.

Furthermore, the memory 25 may store the neural network model (e.g. the deep learning model 26) generated through a learning algorithm for classifying/recognizing data in accordance with the embodiment of the present disclosure.

The AI processor 21 may include a data learning unit 22 which learns the neural network for data classification/recognition. The data learning unit 22 may learn a criterion about what learning data is used to determine the data classification/recognition and about how to classify and recognize data using the learning data. The data learning unit 22 may learn the deep learning model by acquiring the learning data that is used for learning and applying the acquired learning data to the deep learning model.

The data learning unit 22 may be made in the form of at least one hardware chip and may be mounted on the AI device 20. For example, the data learning unit 22 may be made in the form of a dedicated hardware chip for the artificial intelligence AI, and may be made as a portion of the general-purpose processor (CPU) or the graphic dedicated processor (GPU) to be mounted on the AI device 20. Furthermore, the data learning unit 22 may be implemented as a software module. When the data learning unit is implemented as the software module (or a program module including instructions), the software module may be stored in a non-transitory computer readable medium. In this case, at least one software module may be provided by an operating system (OS) or an application.

The data learning unit 22 may include the learning-data acquisition unit 23 and the model learning unit 24.

The learning-data acquisition unit 23 may acquire the learning data needed for the neural network model for classifying and recognizing the data. For example, the learning-data acquisition unit 23 may acquire vehicle data and/or sample data which are to be inputted into the neural network model, as the learning data.

The model learning unit 24 may learn to have a determination criterion about how the neural network model classifies predetermined data, using the acquired learning data. The model learning unit 24 may learn the neural network model, through supervised learning using at least some of the learning data as the determination criterion. Alternatively, the model learning unit 24 may learn the neural network model through unsupervised learning that finds the determination criterion, by learning by itself using the learning data without supervision. Furthermore, the model learning unit 24 may learn the neural network model through reinforcement learning using feedback on whether the result of situation determination according to the learning is correct. Furthermore, the model learning unit 24 may learn the neural network model using the learning algorithm including error back-propagation or gradient descent.

If the neural network model is learned, the model learning unit 24 may store the learned neural network model in the memory. The model learning unit 24 may store the learned neural network model in the memory of the server connected to the AI device 20 with a wire or wireless network.

The data learning unit 22 may further include a learning-data preprocessing unit (not shown) and a learning-data selection unit (not shown) to improve the analysis result of the recognition model or to save resources or time required for generating the recognition model.

The learning-data preprocessing unit may preprocess the acquired data so that the acquired data may be used for learning for situation determination. For example, the learning-data preprocessing unit may process the acquired data in a preset format so that the model learning unit 24 may use the acquired learning data for learning for image recognition.

Furthermore, the learning-data selection unit may select the data required for learning among the learning data acquired by the learning-data acquisition unit 23 or the learning data preprocessed in the preprocessing unit. The selected learning data may be provided to the model learning unit 24. For example, the learning-data selection unit may select only data on the object included in a specific region as the learning data, by detecting the specific region in the image acquired by the camera of the intelligent refrigerator 100.

Furthermore, the data learning unit 22 may further include a model evaluation unit (not shown) to improve the analysis result of the neural network model.

When the model evaluation unit inputs evaluated data into the neural network model and the analysis result outputted from the evaluated data does not satisfy a predetermined criterion, the model learning unit 22 may learn again. In this case, the evaluated data may be predefined data for evaluating the recognition model. By way of example, the model evaluation unit may evaluate that the predetermined criterion is not satisfied when the number or ratio of the evaluated data in which the analysis result is inaccurate among the analysis result of the learned recognition model for the evaluated data exceeds a preset threshold.

The communication unit 27 may transmit the AI processing result by the AI processor 21 to the external electronic equipment.

Here, the external electronic device may be defined as a home appliance electronic device. In addition, the AI device 20 may be defined as other electronic device or 5G network that communicates with the artificial intelligence refrigerating device or the intelligent refrigerator. Meanwhile, the AI device 20 may be implemented with being functionally embedded in an AI module provided in the artificial intelligence refrigerating device or the intelligent refrigerator. Furthermore, the 5G network may include a server or a module that performs a control related to storage information of a food material, stock information of a food material, the artificial intelligence refrigerating device or the intelligent refrigerator.

Although the AI device 20 illustrated in FIG. 6 is functionally divided into the AI processor 21, the memory 25, the communication unit 27 and the like, it is to be noted that the above-described components are integrated into one module, which is referred to as an AI module.

Figure 7:
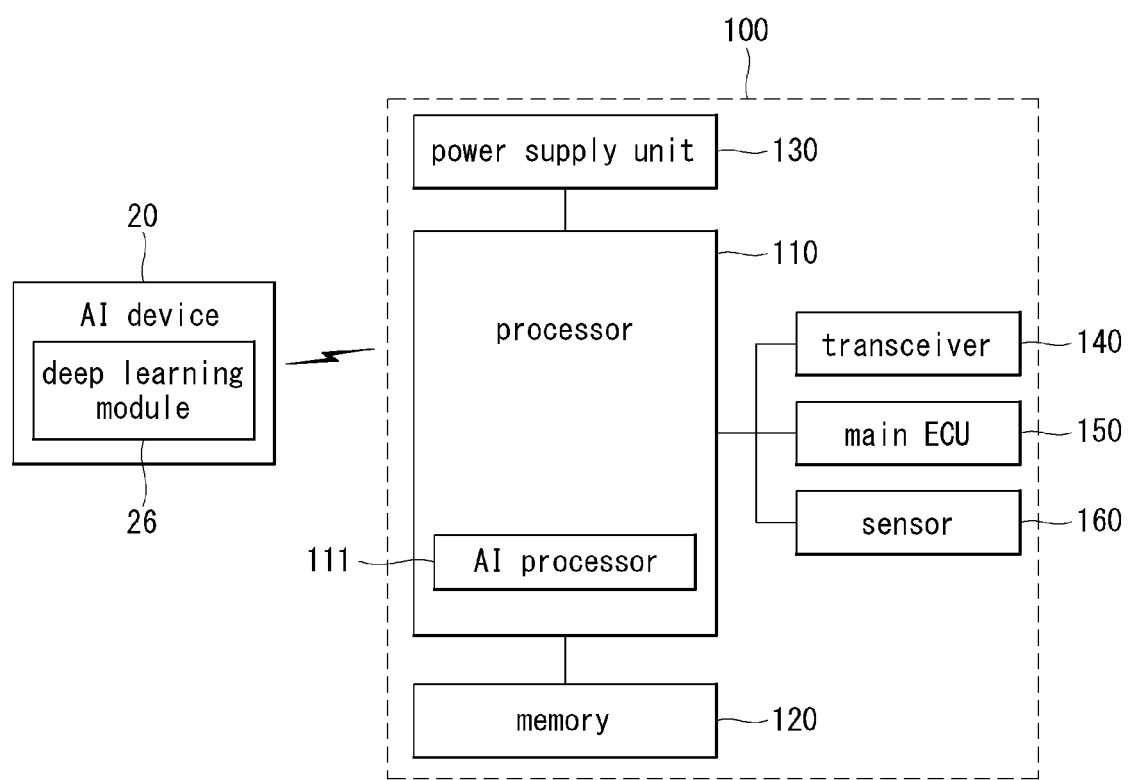
FIG. 7 is a diagram for describing a system in which an artificial intelligence refrigerating device and an AI device are connected according to an embodiment of the present disclosure.

FIG. 7 is a diagram for describing a system in which an artificial intelligence refrigerating device and an AI device are connected according to an embodiment of the present disclosure.

Referring to FIG. 7, the artificial intelligence refrigerating device 100 may transmit data that requires AI processing to the AI device 20 through a transceiver, and the AI device 20 including a deep learning model 26 may transmit an AI processing result using the deep learning model 26 to the artificial intelligence refrigerating device 100. The AI device 20 may refer to the content described in FIG. 6. The artificial intelligence refrigerating device 100 may be referred to as an intelligent refrigerator.

The intelligent refrigerator 100 may include a memory 120, a processor 110 and a power supply unit 130, and the processor 110 may further include an AI processor 111. In addition, the intelligent refrigerator 100 may include an interface unit connected with at least one electronic device provided in the refrigerator in wired or wireless manner for driving the refrigerator, controlling an inner temperature of the refrigerator and exchanging data or metadata required for a photographed image. At least one electronic device connected through the interface unit may include a transceiver 140, a main ECU 150 and a sensor 160.

The interface unit may include at least one of: a communication module, a terminal, a pin, a cable, a port, a circuit, a device and an apparatus.

The memory 120 is electrically connected to the processor 110. The memory 120 may store a basic data for a unit, a control data for controlling an operation of the unit and an input/output data. The memory 120 may store the data processed in the processor 110. The memory 120 may include at least one of ROM, RAM, EPROM, flash drive and hard drive as hardware. The memory 120 may store various types of data for overall operations for the intelligent refrigerator 100 such as a program for processing or controlling. For example, the memory 120 may store a photographed image photographing an inside of the refrigerator, various types of data related to the photographed image, AI processed data in relation to it, a variance of refrigerating compartment temperature and a variance of freezing compartment temperature.

The memory 120 may be integrally implemented with the processor 110. According to an embodiment, the memory 120 may be classified as a lower layer component of the processor 110.

The power supply unit 130 may provide power to the intelligent refrigerator 100. The power supply unit 130 may be provided with power from a power source included in the intelligent refrigerator 100 and may supply power to each unit of the intelligent refrigerator 100. The power supply unit 130 may operate depending on a control signal provided from the main ECU 150. The power supply unit 130 may include a switched-mode power supply (SMPS).

The processor 110 may be electrically connected with the memory 120, the interface unit (not shown) and the power supply unit 130 and exchange a signal. The processor may be implemented by using at least one of ASICs (application specific integrated circuits), DSPs (digital signal processors), DSPDs (digital signal processing devices), PLDs (programmable logic devices), FPGAs (field programmable gate arrays), controllers, micro-controllers, microprocessors and other electronic units for performing functions.

The processor 110 may be driven by the power provided from the power supply unit 130. The processor 110 may receive a data, process a data, generate a signal and provide a signal in the state that power is provided form the power supply unit 130.

The processor 110 may receive information from the other electronic device in the intelligent refrigerator 100 through the interface unit. The processor 110 may provide a control signal to the other electronic device in the intelligent refrigerator 100 through the interface unit.

The processor 110 may control the refrigerator to photograph a food material stored inside of the refrigerator, compare the photographed image with a preconfigured previous image, and transmit storage information of the food material to a cloud according to a comparison result. The processor 110 may control the refrigerator to learn the transmitted storage information of the food material, determine a stock state of the food material based on the learned storage information of the food material and determine whether to transmit relation information related to the food material depending on the determined stock state of the food material.

In addition, the processor 110 may perform a normal operation of maintaining an inside temperature of the refrigerating compartment 40 (refer to FIG. 5) or an inside temperature of the freezing compartment 50 (refer to FIG. 5) as a predetermined temperature corresponding to the food material or a load correspondence operation based on a variance of an inside temperature of the refrigerating compartment 40 (refer to FIG. 5) or a variance of an inside temperature of the freezing compartment 50 (refer to FIG. 5) according to a predetermined time period. The processor 110 may be referred to as a refrigerator processor or a refrigerator controller. Different from the normal operation, the load correspondence operation is an operation scheme such that the intelligent refrigerator 100 is in an operation of normal state by increasing or decreasing cooling capacity depending on a load change.

The intelligent refrigerator 100 may include at least one printed circuit board (PCB). The memory 120, the interface unit, the power supply unit 130 and the processor 110 may be electrically connected on the PCB.

Hereinafter, other electronic device and the AI processor 111 in the intelligent refrigerator 100 connected with the interface unit are described in more detail. Hereinafter, for the convenience of description, the intelligent refrigerator 100 is called a refrigerator.

The refrigerator 100 may transmit data obtained using at least one sensor 160 to the AI device 20 through the transceiver 140. The AI device 20 may apply a neural network model 26 to the transmitted data and transmit the generated AI processing data to the refrigerator 100. The refrigerator 100 may identify information for a detected food material based on the received AI processing data and may perform overall control operations for the refrigerator 100 such as a door state of the refrigerator 100, an inner temperature of the refrigerator 100 as well as storage information of the food material or stock information of the food material by using the identified information.

The transceiver 140 may exchange a signal with a device located exterior of the refrigerator 100. The transceiver 140 may exchange a signal with at least one of an infra (e.g., server, broadcasting station), a smart device or a smart terminal. The transceiver 140 may include at least one of: a transmission antenna, a reception antenna, a RF (Radio Frequency) circuit in which various types of communication protocol is implementable and a RF device.

The main ECU (Electronic Control Unit) 150 may control overall operations of at least one electronic device and a driving device provided in the refrigerator 100. The main ECU 150 may receive a data related to the refrigerator 100 and may control the at least one electronic device and the driving device.

In the AI processor 111, a data related to the refrigerator 100 may be a driving control signal which is generated by applying the neural network model. The driving control signal may also be a signal received from the external AI device 20 through the transceiver 140.

The sensor 160 may sense the storage state for the food material stored in the refrigerator 100 as well as a state of the refrigerator 100. For example, the sensor may include at least one of: a temperature sensor, a humidity sensor, an ultrasonic sensor, a luminance sensor and a photographing sensor.

The AI processor 111 may apply the neural network model to the sensing data generated in the at least one sensor 160 and may generate state data or storage state data of the food material stored in the refrigerator. The AI processing data generated by applying the neural network model may include an inner temperature data of the refrigerator 100, an inner humidity data of the refrigerator 100, an inner luminance data of the refrigerator 100, an external temperature data of the refrigerator 100, an external humidity data of the refrigerator 100, a storage data of food material stored inside of the refrigerator 100, and the like.

The refrigerator 100 may transmit the sensing data obtained using at least one sensor 160 to the AI device 20 through the transceiver 140. The AI device 20 may apply the neural network model 26 to the transmitted sensing data and may transmit the generated AI processing data to the refrigerator 100.

According to an embodiment, the AI processor 111 may perform a deep learning operation based on a plurality of data sensed in the sensor and may determine or decide a storage state of the photographed food material or a stock state of the food material based on the generated AI processing data.

The refrigerator 100 may include an internal communication system (not shown). A plurality of electronic devices included or embedded in the refrigerator 100 may exchange a signal as a medium of the internal communication system 50. A data may be included in the signal. The internal communication system (not shown) may use at least one communication protocol (e.g., CAN, LIN, FlexRay, MOST, ethernet).

The AI processor 111 may apply the stock information of the food material received from at least one sensor 160 provided in the refrigerator 100 and an external device to the neural network model.

So far, it is described the 5G communication required for implementing a method for controlling the intelligent refrigerator 100 according to an embodiment of the present disclosure and the schematic description for performing the AI processing by applying the 5G communication and transmitting and receiving the AI processing result.

Hereinafter, it is described a detailed method of passively or actively intervening in a stock state of a food material based on the storage information of the food material stored in the refrigerator 100 according to an embodiment of the present disclosure with reference to required drawings.

Figure 8:
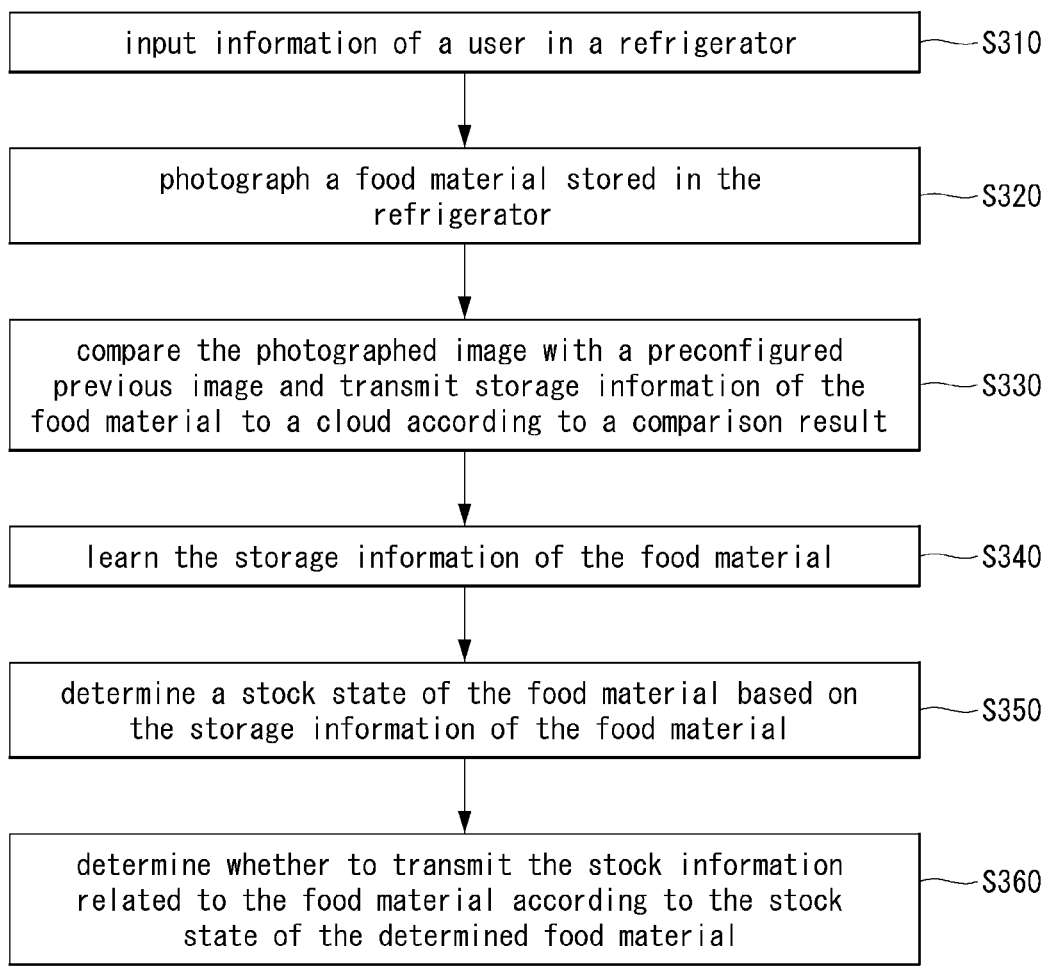
FIG. 8 is a diagram for describing an example of a method for controlling a refrigerator according to an embodiment of the present disclosure.

FIG. 8 is a diagram for describing an example of a method for controlling a refrigerator according to an embodiment of the present disclosure.

Referring to FIG. 8, a method for controlling a refrigerator according to an embodiment of the present disclosure may include an input step, a photographing step, a transmitting step, a learning step, a determining step and a determining step. Hereinafter, a configuration of device refers to FIG. 5 to FIG. 7.

The input step is a step of inputting information of a user in a refrigerator (step, S310). In the case that the user purchases the refrigerator, the user may store user information related to the user in the refrigerator. A processor may store the user information input by the user in a memory and transmit it to a cloud or a server together with photograph information to be described below. The user information may include a gender of the user, an age of the user, body information of the user, the number of family living together with the user, and the like. The user information may be upgraded in real time by the user and may be modified in some cases.

The photographing step is a step of photographing a food material stored in the refrigerator (step, S320). The processor may control a photographing sensor and may photograph the material stored inside of the refrigerator.

The processor may control at least one sensor and sense an angle of a door of the refrigerator to be opened. For example, in the case that the door of the refrigerator exceeds a predetermined angle range, a distance sensor may sense it and transmit generated separation information to the processor. When the separation information is received, the processor may control the photographing sensor to photograph the food material stored inside of the refrigerator and generate photograph information. For example, the photographing sensor may be a camera. The photographing sensor may photograph the food material and transmit the related photograph information to the processor or the memory. For example, the photograph information may include a photographed image photographing the food material, a photographing time photographing the food material, a luminance when photographing the food material, and the like.

The processor may generate photograph information by photographing whenever the door of the refrigerator is opened and closed by using the photographing sensor.

The processor may store the generated photograph information in the memory. The photograph information may be stored in the memory by being classified for each time or data under a control of the processor.

The transmitting step is a step of comparing the photographed image with a preconfigured previous image and transmitting storage information of the food material to a cloud according to a comparison result (step, S330). The processor may receive the photograph information and compare it with a preconfigured previous image. The photograph information may include a photographed image. The photographed image may be referred to as a current frame. The previous image may be referred to as a previous frame.

The processor may compare the current frame with the previous frame, and in the case that the current frame is substantially the same as the previous frame, the processor may transmit information related to a photographing time except the photographed image among the photograph information to a cloud. That is, in the case that the current frame is substantially the same as the previous frame, the processor is not required to upgrade the substantially same frame but transmit changed information from the photograph information. Accordingly, the processor may reduce unnecessary data consumption.

The processor may compare the current frame with the previous frame, and in the case that the current frame is different from the previous frame, the processor may transmit the photograph information and the user information to the cloud. The processor may transmit the photograph information and the user information by compressing or dividing it by considering a network environment.

The cloud may display the photograph information and the user information on a predetermined screen. This will be described in detail below.

The learning step is a step of learning the storage information of the food material (step, S340). The processor may learn the storage information of the food material by using a program stored in the memory. The processor may use the neural network and learn to recognize information or data related to the food material storage. The neural network for recognizing the information or data information related to the food material storage may be designed to simulate a brain structure of a human on a computer and may include a plurality of network nodes having a weight of simulating neuron of human neural network. The plurality of network nodes may exchange the information or data information related to the food material storage according to a connection relation so as to simulate a synaptic activity of the neuron that exchanges a signal through the synapse by the neuron.

The neural network may include a deep learning model evolved from the neural network model. In the deep learning model, a plurality of network nodes may be positioned in different layers and may change data in a convolution connection relation. An example of the neural network model may include various deep learning techniques such as DNN (deep neural networks), CNN (convolutional deep neural networks), RNN (Recurrent Boltzmann Machine), RBM (Restricted Boltzmann Machine), DBN (deep belief networks) and Deep Q-Network, and may be applied to a computer vision, a voice recognition, a natural language process, voice/signal process, and the like.

The determining step is a step of determining a stock state of the food material based on the storage information of the food material (step, S350). The processor may recognize the storage information of the food material by using the neural network and may check or identify the amount of remaining food material based on the recognized storage information of the food material. The processor may determine the stock of the food material is normal state in the case that the checked amount of food material is a preconfigured range or more. Or, the processor may determine the stock of the food material is deficient state in the case that the checked amount of food material is a preconfigured range or lower.

The determining step is a step of determining whether to transmit the stock information related to the food material according to the stock state of the determined food material (step, S360). In the case that the stock of the food material is deficient state, the processor may transmit the stock information related to the food material to a cloud or a server.

The cloud or the server may analyze the transmitted stock information and transmit various advertisements, a discount ticket, and the like related to the product and the food material to the processor.

In the case that the stock of the food material is normal state, the processor may not transmit the stock information related to the food material to a cloud or a server.

Figure 10:
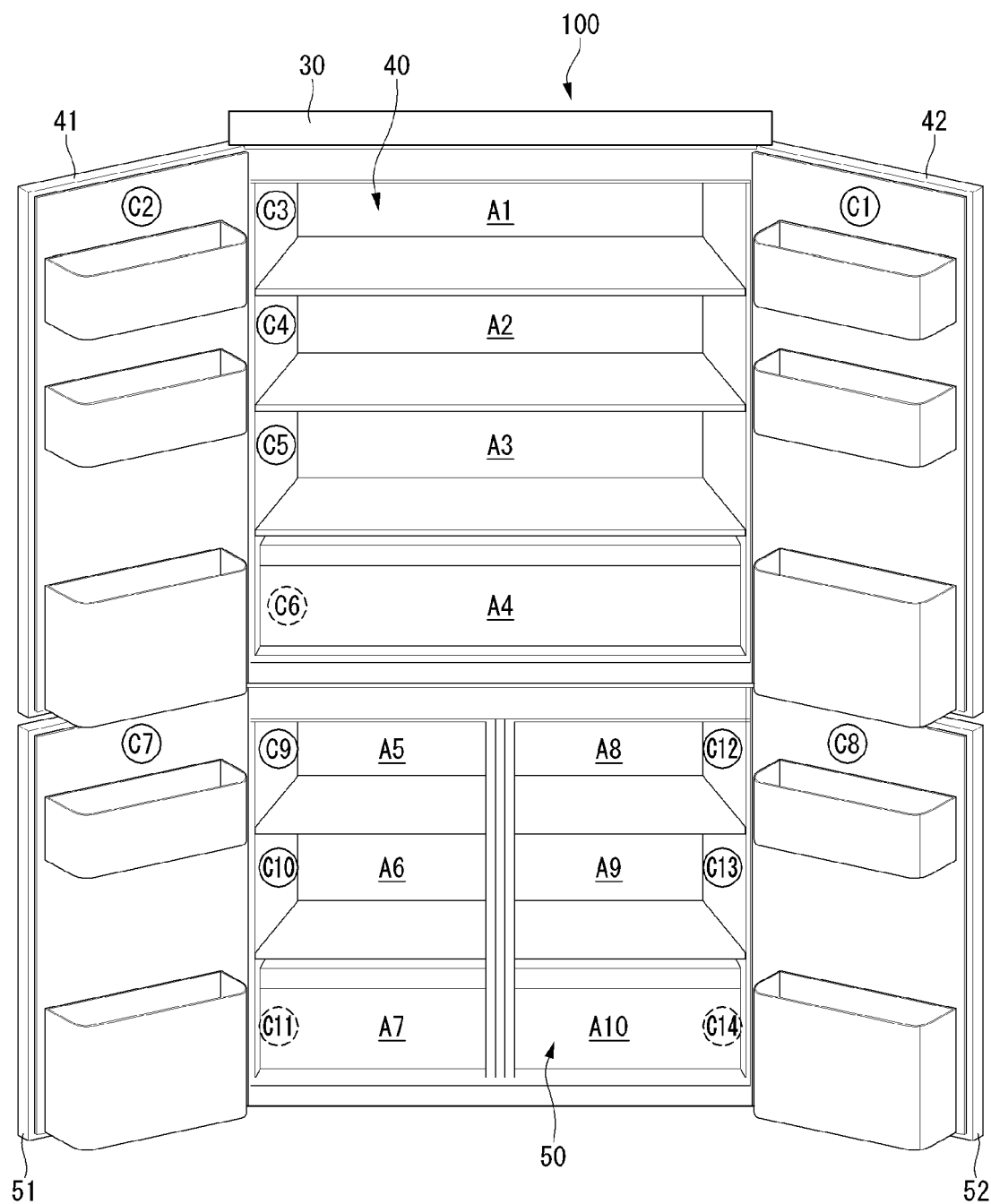
FIG. 10 is a diagram for describing at least one area and a photographing sensor according to an embodiment of the present disclosure.

FIG. 9 is a diagram for describing another example of a method for controlling a refrigerator according to an embodiment of the present disclosure. FIG. 10 is a diagram for describing at least one area and a photographing sensor according to an embodiment of the present disclosure.

In FIG. 5 to FIG. 8, it is described that the photographing sensors C3 to C6, C9 to C14 may photograph an inside of the refrigerator 100 with being installed in a door of the refrigerator 100 and generate the storage information of the food material, but the present disclosure is not limited thereto. The processor may synthesize a plurality of photographed images photographed by at least one of the photographing sensors C3 to C6, C9 to C14 by using an image synthesizing algorithm.

Referring to FIG. 9 and FIG. 10, the step of photographing the food material (step, S320) may include dividing the inside of the refrigerator into at least one area and photographing each of the divided areas (step, S321) and synthesizing the photographing images into a single whole image (step, S322).

The processor may divide the inside of the refrigerator 100 into at least one area. The processor may install the photographing sensors C3 to C6, C9 to C14 in the divided areas A1 to A10, respectively, and may photograph it. For example, the refrigerator may be configured as a first area A1 to a tenth area A10. The first area A1 to the tenth area A10 may be sequentially located as progressing from a top to a bottom of the inside of the refrigerator. A refrigerating temperature or a freezing temperature of each areas of the first area A1 to the tenth area A10 may be different. For example, the fourth area A4 may be the lowest area in the inside of the refrigerator and may also be referred to as a vegetable/fruit area or a vegetable/fruit section.

The photographing sensors C3 to C6, C9 to C14 may include the first photographing sensor C1 (refer to FIG. 5) to the fourteenth photographing sensor C14. For example, the third photographing sensor may be positioned in the first area and may photograph the first area. The fourteenth photographing sensor may be positioned in the tenth area and may photograph the tenth area.

The processor may receive the images photographed from the first photographing sensor C1 (refer to FIG. 5) to the fourteenth photographing sensor C14 and may synthesize them into a single whole image. The processor may use an image synthesizing program or algorithm. For example, the image synthesizing program may include Sum, Average, Median, Sigma Clip, and the like. The Sum algorithm may add brightness of all pixels to be a single pixel. For example, in the case that pixels of three images is 1, 4 and 3, respectively, a brightness of a pixel located in a position the same as the synthesized image may be 8. The Average algorithm may average brightness of all pixels to be a single pixel. For example, in the case that pixels of three images is 1, 4 and 3, respectively, a brightness of a pixel located in a position the same as the synthesized image may be 2.7. The Median algorithm may make a pixel of middle brightness of all pixels to be a single pixel. For example, in the case that pixels of three images is 1, 4 and 3, respectively, a brightness of a pixel located in a position the same as the synthesized image may be 3. The Sigma Clip algorithm may obtain an average and a standard deviation from brightness of all pixels, and then, make it as a single pixel by averaging data of the remaining pixels by removing a specific pixel deviating the standard deviation. For example, in the case that pixels of three images is 1, 4 and 3, respectively, a brightness of a pixel located in a position the same as the synthesized image may be 3.5 which is an average value of 4 and 3 except a brightness of 1.

Figure 11:
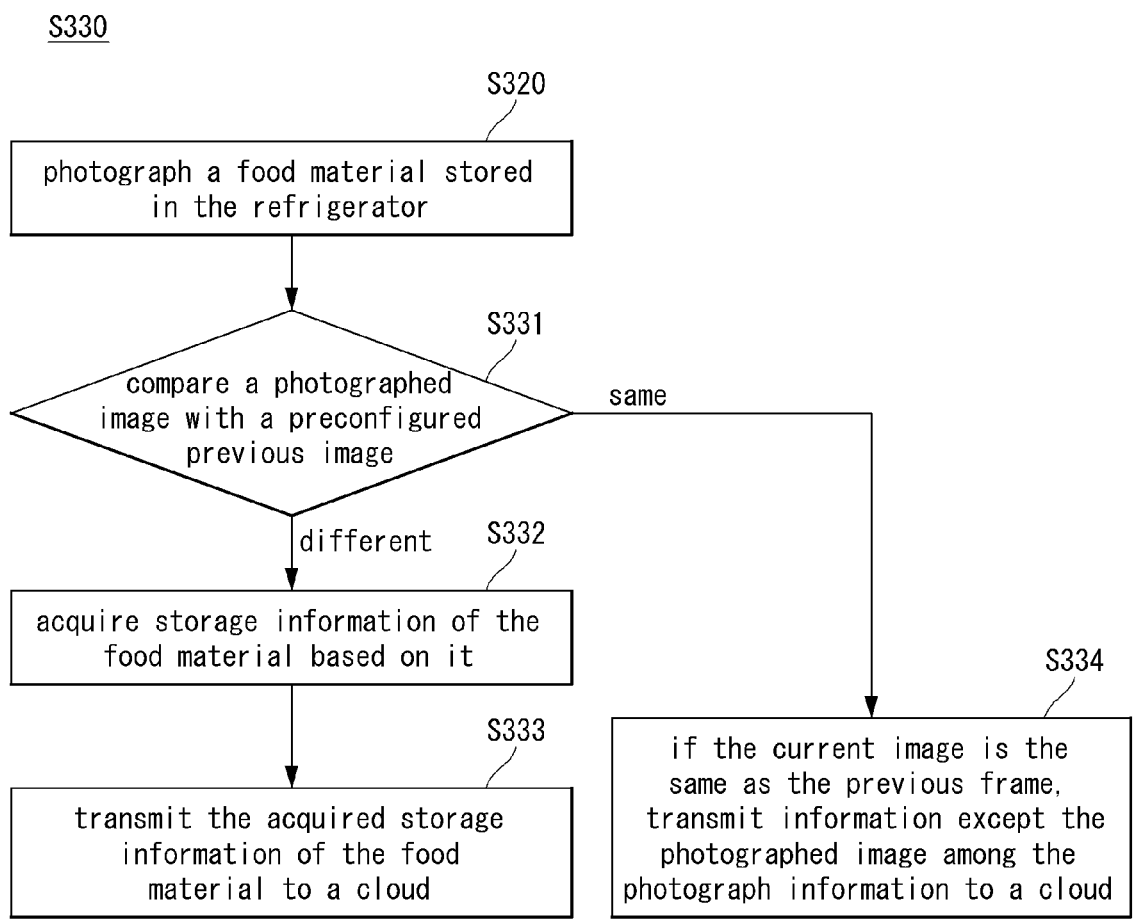
FIG. 11 is a diagram for describing another example of a method for controlling a refrigerator according to an embodiment of the present disclosure.

FIG. 11 is a diagram for describing another example of a method for controlling a refrigerator according to an embodiment of the present disclosure.

Referring to FIG. 11, a step of transmitting storage information of a food material according to an embodiment of the present disclosure may include a comparing step S331, an acquiring step S332 and a transmitting step S333.

A processor may compare a photographed image with a preconfigured previous image (S331). The processor may compare the current frame with the previous frame. The processor may check a difference between them by comparing the current frame with the previous frame. The current frame may be a photographed image or a synthesized photographed image. The previous frame may be a preconfigured previous image. The previous image may include a photographed image which is synthesized with a photographed image previously photographed.

As a result of the comparison, in the case that the current image is substantially the same as the previous frame, the processor may transmit information related to a photographing time except the photographed image among the photograph information to a cloud (step, S334). That is, in the case that the current frame is substantially the same as the previous frame, the processor is not required to upgrade the substantially same frame but transmit changed information from the photograph information. Accordingly, the processor may reduce unnecessary data consumption.

As a result of the comparison, in the case that the previous image is different from the photographed image, the processor may acquire storage information of the food material based on it (step, S332). The processor may compare the current frame with the previous frame, and in the case that the current frame is different from the previous frame, the processor may acquire storage information of the food material based on it. For example, the storage information of the food material may include a position change of the food material, an amount of the food material, the number of food material, a newly added food material, a disappeared food material, and the like.

The processor may transmit the acquired storage information of the food material to a cloud (step, S333). The processor may transmit the acquired storage information of the food material and the previously stored user information to the cloud. The processor may transmit the photograph information and the user information by compressing or dividing it by considering a network environment.

The processor may transmit the 5G network photograph information and the user information in real time or in every predetermine time. For example, the processor may transmit the acquired storage information of the food material and the previously stored user information in every alternative hour or in every two hours.

Figure 12:
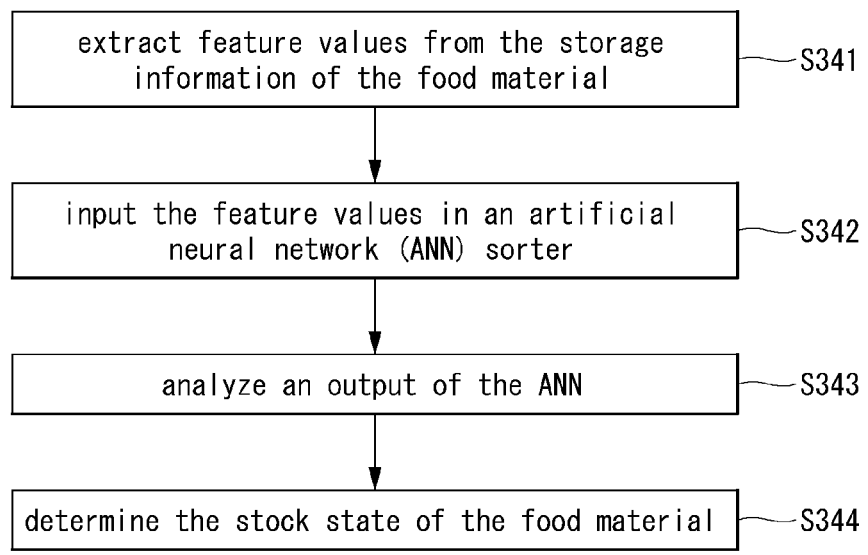
FIG. 12 is a diagram for describing an example of determining a stock state of a food material according to an embodiment of the present disclosure.

FIG. 12 is a diagram for describing an example of determining a stock state of a food material according to an embodiment of the present disclosure.

Referring to FIG. 12, a processor may extract feature values from the storage information of a food material in order to determine a stock state of the food material based on learned storage information of the food material.

For example, the processor may receive the storage information of the food material from at least one sensor (e.g., photographing sensor). The processor may extract feature values from the storage information of the food material (step, S341). The feature value is determined to be a value that particularly distinguishes whether the food material is in stock among at least one features that may be extracted from the storage information of the food material.

The processor may control the feature values to be input in an artificial neural network (ANN) sorter which is trained to identify or determine whether the stock of the food material stored in the refrigerator is normal state or deficient state (step, S342).

The processor may generate a stock detection input to which the extracted feature value is combined. The stock detection input may be input in an artificial neural network (ANN) sorter which is trained to identify whether the stock of the food material stored in the refrigerator is normal state or deficient state based on the extracted feature value.

The processor may analyze an output of the ANN (step, S343) and determine the stock state of the food material based on the ANN output value (step, S344).

The processor may identify whether the stock of the food material is normal state and whether the stock of the food material is going to be exhausted, and whether the stock of the food material is exhausted state or deficient state.

Meanwhile, in FIG. 12, an example is described that an operation of recognizing the stock state of the food material through an AI processing is implemented in the processing of an artificial intelligence refrigerating device, but the present disclosure is not limited thereto. For example, the AI processing may be performed on a 5G network based on the sensing information (or storage information) received from the artificial intelligence refrigerating device.

Figure 13:
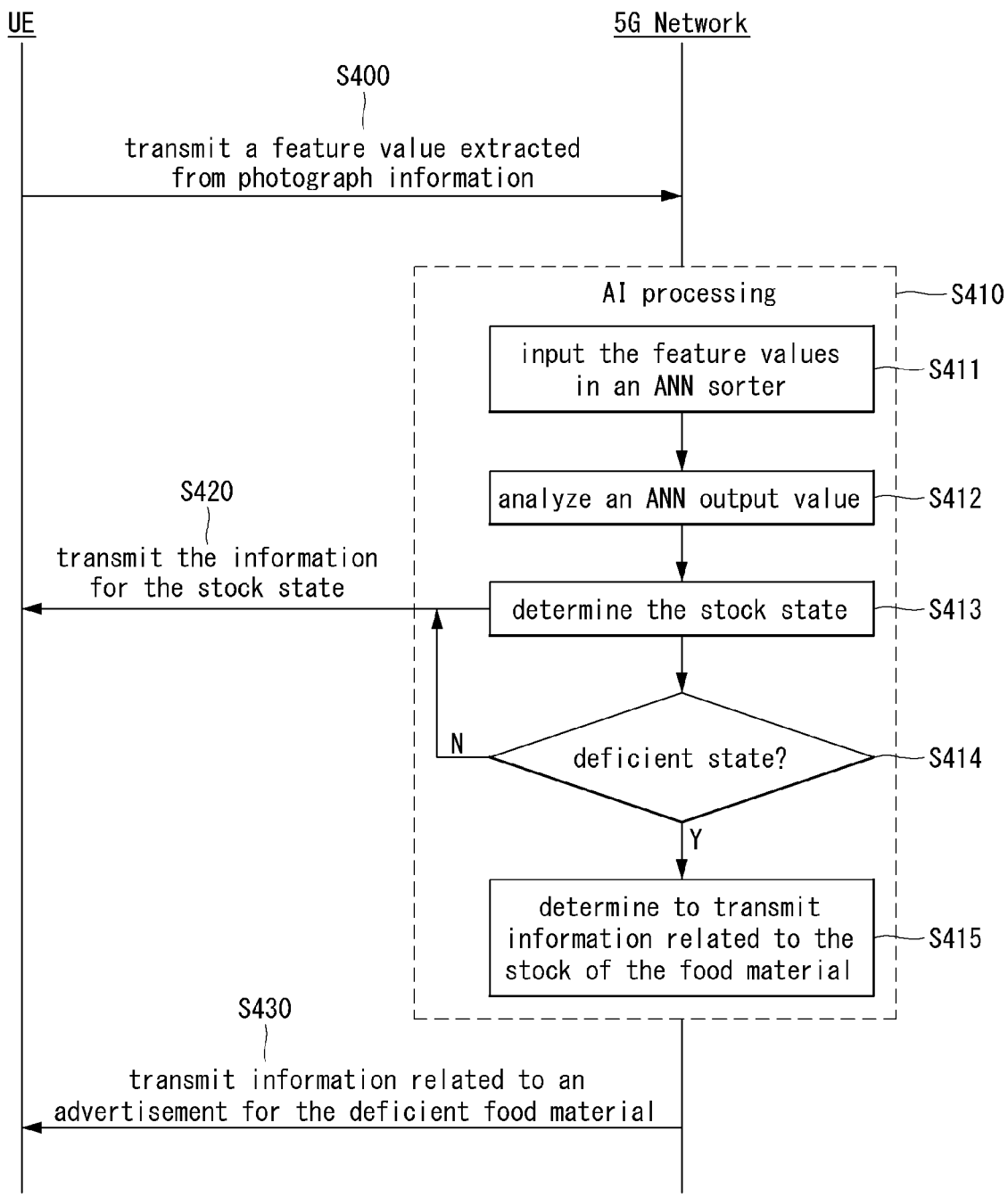
FIG. 13 is a diagram for describing another example of determining a stock state of a food material according to an embodiment of the present disclosure.

FIG. 13 is a diagram for describing another example of determining a stock state of a food material according to an embodiment of the present disclosure.

A processor may control a transceiver to transmit storage information of a food material to an AI processor. In addition, the processor may control the transceiver to receive AI processed information from the AI processor.

The AI processed information may be information of determining the storage information of the food material and a stock state of the food material.

Meanwhile, a refrigerator may perform an initial access process to a 5G network to transmit the storage information of the food material to the 5G network. The refrigerator may perform an initial access process with the 5G network based on Synchronization signal block (SSB).

In addition, the refrigerator may receive Downlink Control Information (DCI) used for scheduling a transmission of the storage information of the food material obtained from at least one sensor provided in the refrigerator through the transceiver.

The processor may transmit the storage information of the food material to the network based on the DCI.

The storage information of the food material may be transmitted to the network through a PUSCH, and the SSB and a DM-RS of the PUSCH are QCLed with respect to QCL type D.

Referring to FIG. 13, the refrigerator may transmit a feature value extracted from photograph information or a photographed image to a 5G network (step, S400).

Here, the 5G network may include an AI processor or an AI system, and the AI system of the 5G network may perform an AI processing based on the received sensing information or the photograph information (step, S410).

The AI system may input the feature values received from the refrigerator in an ANN sorter (step, S411). The AI system may analyze an ANN output value (step, S412) and determine the stock state of the food material from the ANN output value (step, S413). The 5G network may transmit the information for the stock state of the food material determined in the AI system to the refrigerator through a transceiver (step, S420).

Here, the stock state information of the food material may include whether a stock of the food material is normal state and whether the stock of the food material is going to be exhausted, and whether the stock of the food material is exhausted state or deficient state.

In the case that the AI system determines the stock of the food material to be deficient state (or including the case that the stock of the food material is switched from the deficient state to the exhausted state) (step, S414), the AI system may determine to transmit information related to the stock of the food material to a cloud or a server (step, S415).

In the case that the stock of the food material is in exhausted state or deficient state, the AI system may transmit the information related to the stock of the food material to a cloud or a server and receive an advertisement for the deficient food material or the exhausted food material from the cloud or the server or receive prices therefor, and the like.

In addition, the AI system may transmit an advertisement for the deficient food material or the exhausted food material received from the cloud or the server or information related to the prices therefor to the refrigerator (step, S430).

Meanwhile, the refrigerator may transmit only the sensing information or the photograph information to the 5G network and extract a feature value corresponding to a stock detection input which is to be used as an input of artificial neural network for determining the stock state of the food material from the sensing information or the photograph information in the AI system included in the 5G network.

Figure 14:
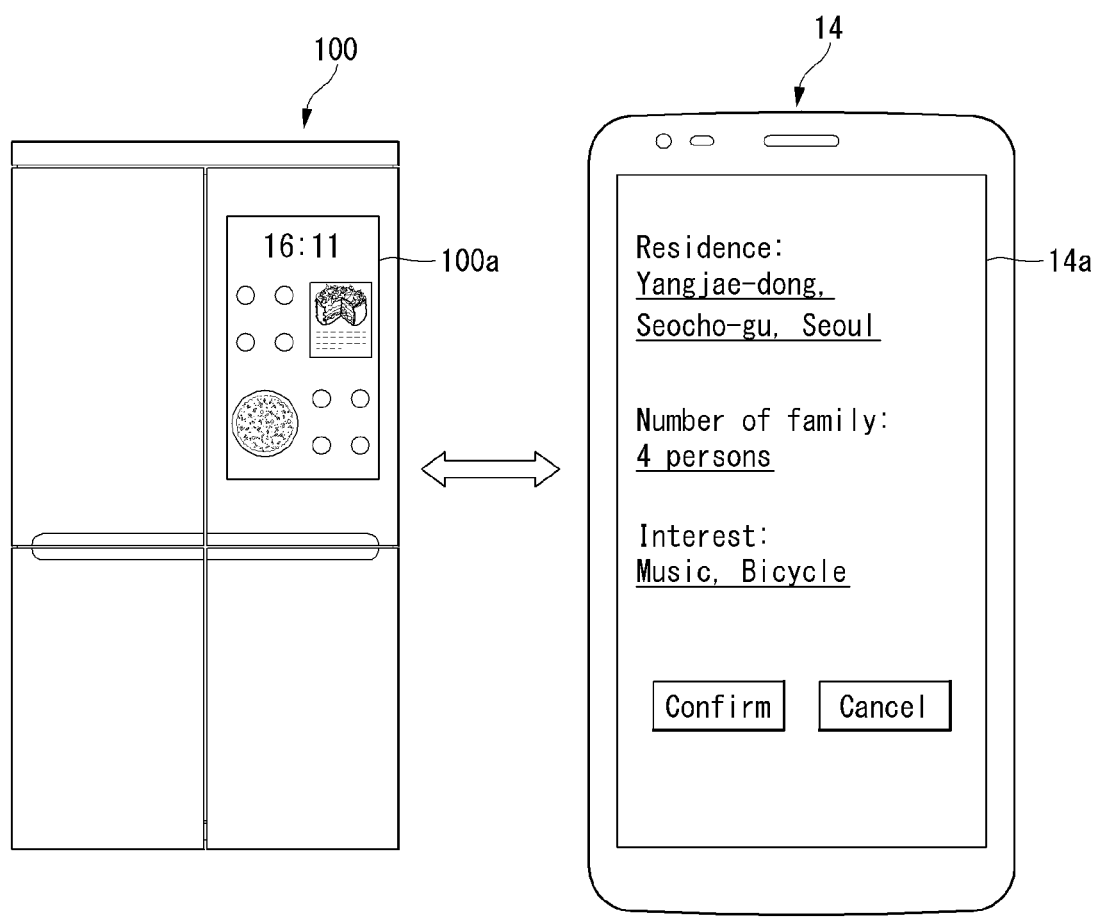
FIG. 14 is a diagram for describing an example of an input method of a method for controlling a refrigerator according to an embodiment of the present disclosure.

FIG. 14 is a diagram for describing an example of an input method of a method for controlling a refrigerator according to an embodiment of the present disclosure.

As shown in FIG. 14, the intelligent refrigerator 100 may be connected to a smart device 14 and may transmit or receive information.

The intelligent refrigerator 100 may be electrically connected to the smart device 14 by using an installed transceiver (not shown). In the case that a user purchases the intelligent refrigerator, the user may set the intelligent refrigerator 100 by considering a peripheral environment and a personal taste of the user. The user may input personal information for the user in the intelligent refrigerator 100. The intelligent refrigerator 100 may store the input personal information of the user.

When a display part 100a installed on the intelligent refrigerator 100 is installed, the user may touch the display part 100a and input the personal information of the user directly. Alternatively, the user may register the smart device 14 in the intelligent refrigerator 100. The user may input the personal information of the user in a screen 14a of the smart device and transmit it to the intelligent refrigerator 100.

The personal information of the user may be a residence of the user, the number of family members, an interest of the user, a food that the user likes, a food that the user dislikes, and the like. A part of the personal information of the user may be provided to a purchaser that purchases the photograph information.

Figure 15:
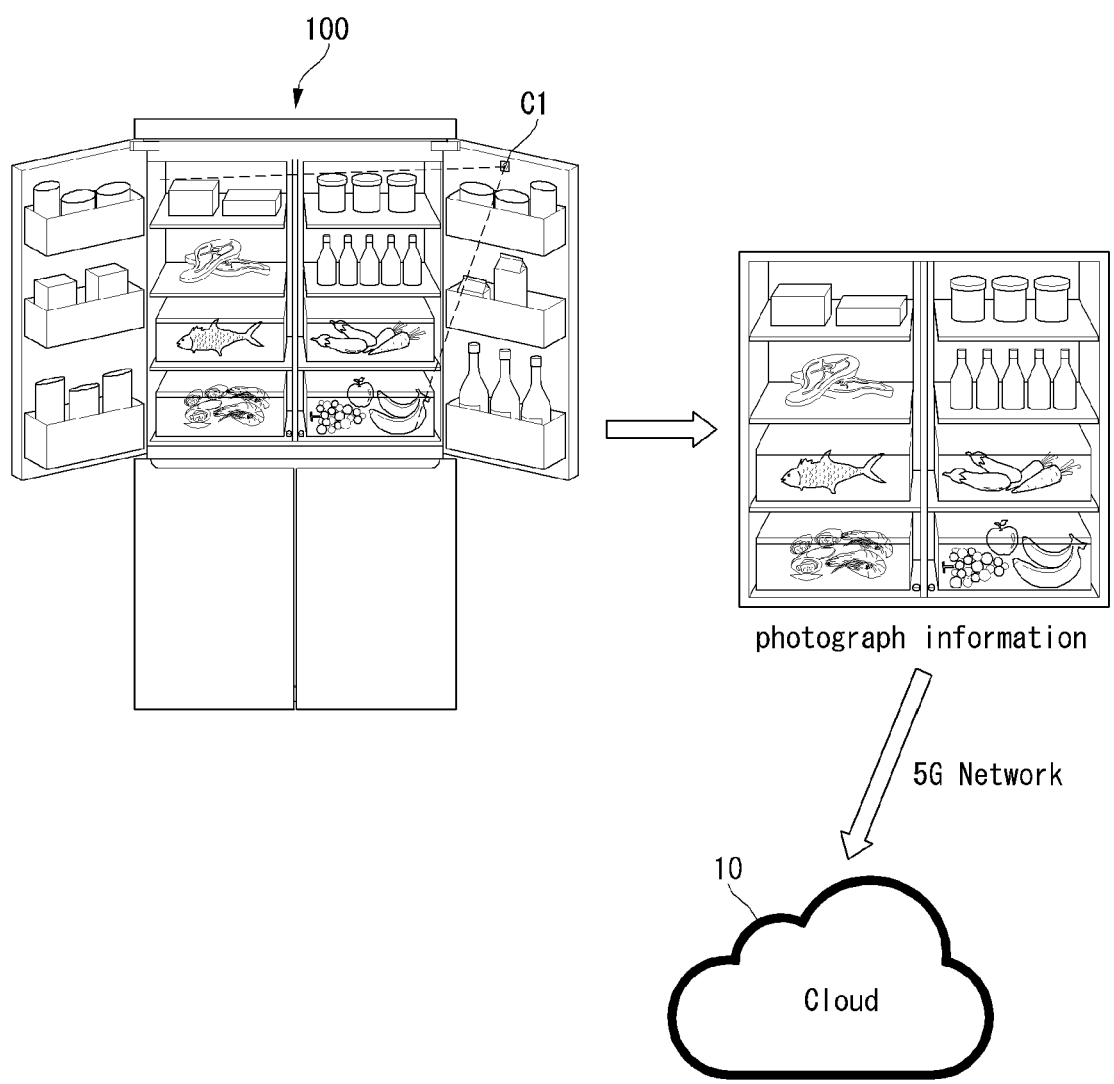
FIG. 15 is a diagram for describing an example of photographing of a method for controlling a refrigerator according to an embodiment of the present disclosure.

FIG. 15 is a diagram for describing an example of photographing of a method for controlling a refrigerator according to an embodiment of the present disclosure.

As shown in FIG. 15, the intelligent refrigerator 100 may be mounted with the photographing sensor C1. Since the photographing sensor is described in detail above, the description is omitted.

The photographing sensor C1 may generate photograph information by photographing an inside of the intelligent refrigerator 100 whenever a door of the intelligent refrigerator 100 is closed and opened. The generated photograph information may be transmitted to a 5G network or a server through a transceiver.

A processor may store the generated photograph information in a memory. The photograph information may be stored in the memory with being by being classified for each time or data under a control of the processor.

The processor may compare the photographed image with a preconfigured previous image and transmit photograph information to a cloud according to a comparison result. The photograph information may be referred to the storage information of the food material or a current frame.

The processor may be provided with the photograph information and compare it with a preconfigured previous frame.

The processor may compare the current frame with the previous frame, and in the case that the current frame is different from the previous frame, the processor may transmit the photograph information and the user information to a cloud 10.

Figure 16:
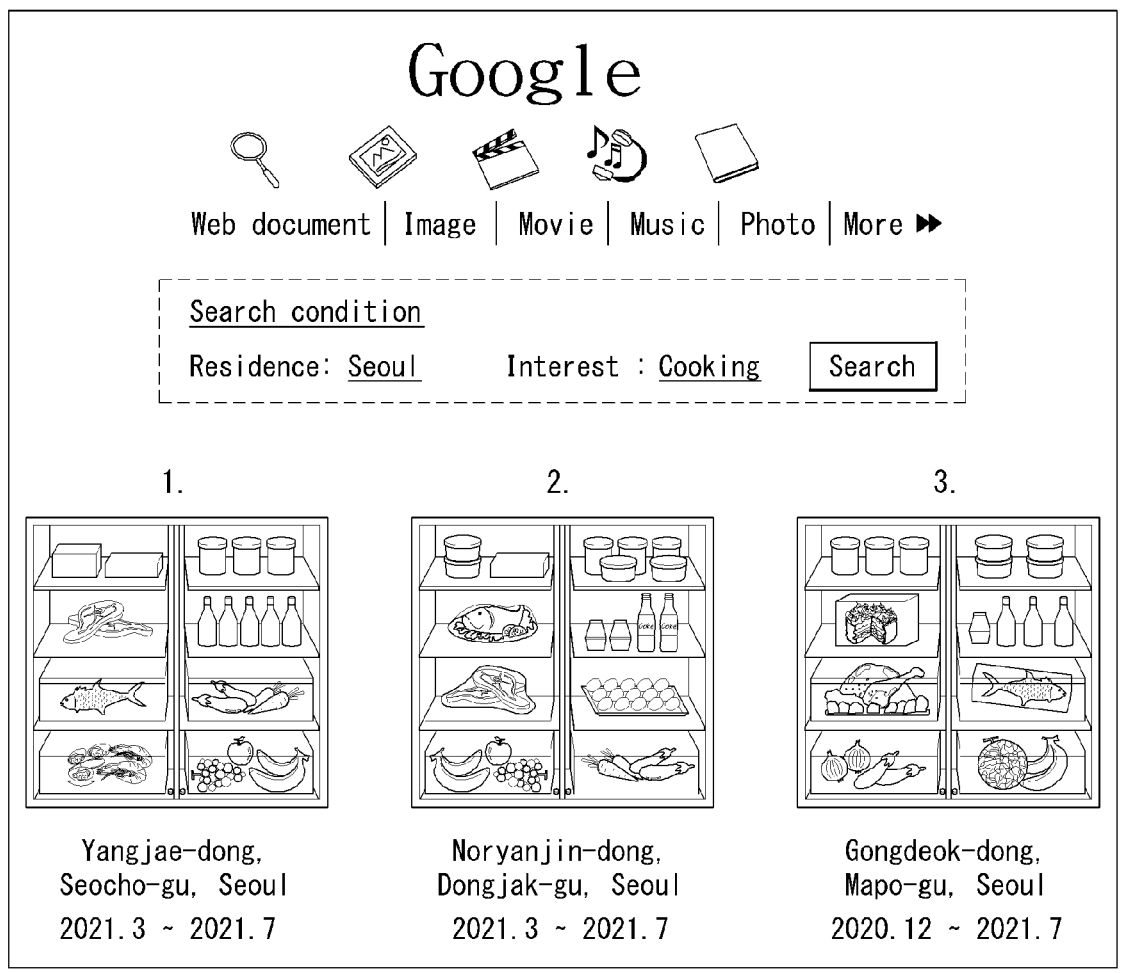
FIGS. 16 to 18 are diagrams for describing a method of selling photograph information of a method for controlling a refrigerator according to an embodiment of the present disclosure.
Figure 17:
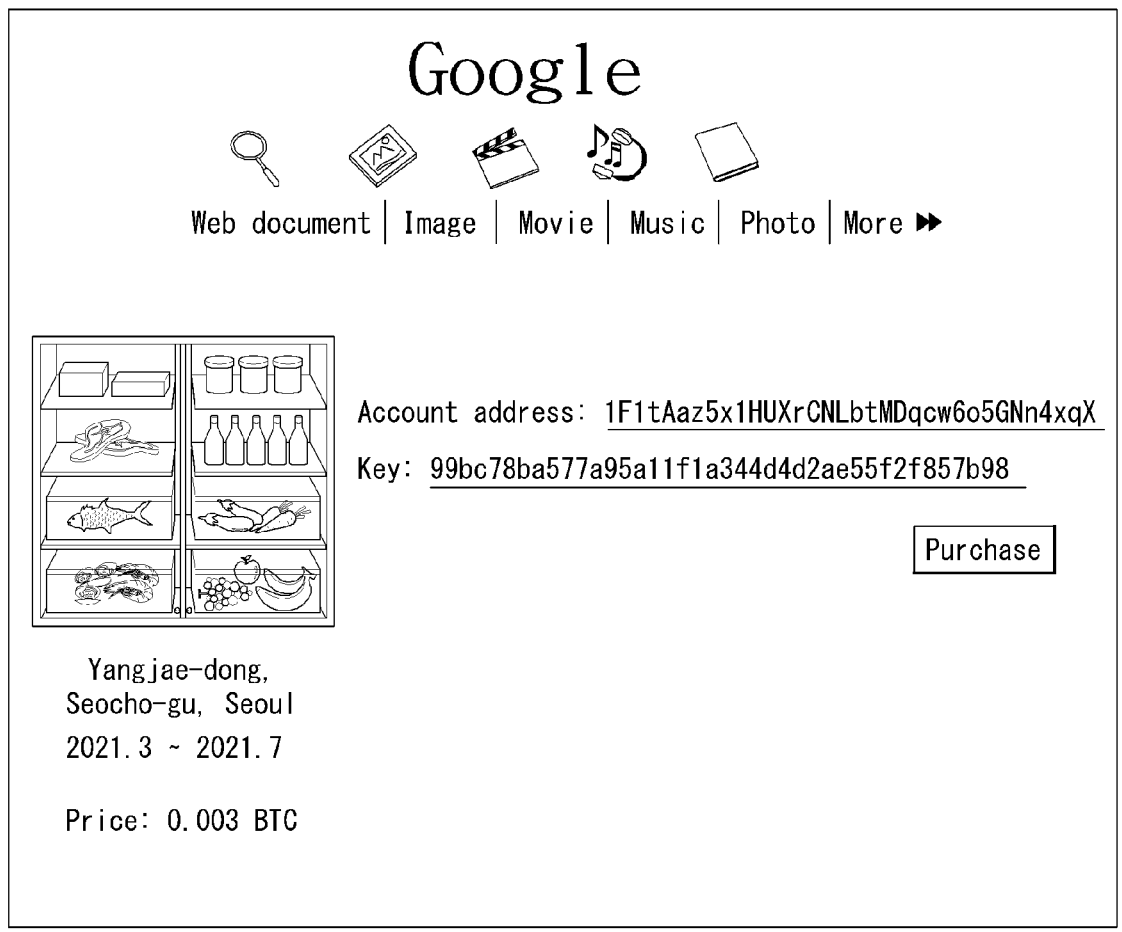
Figure 18:
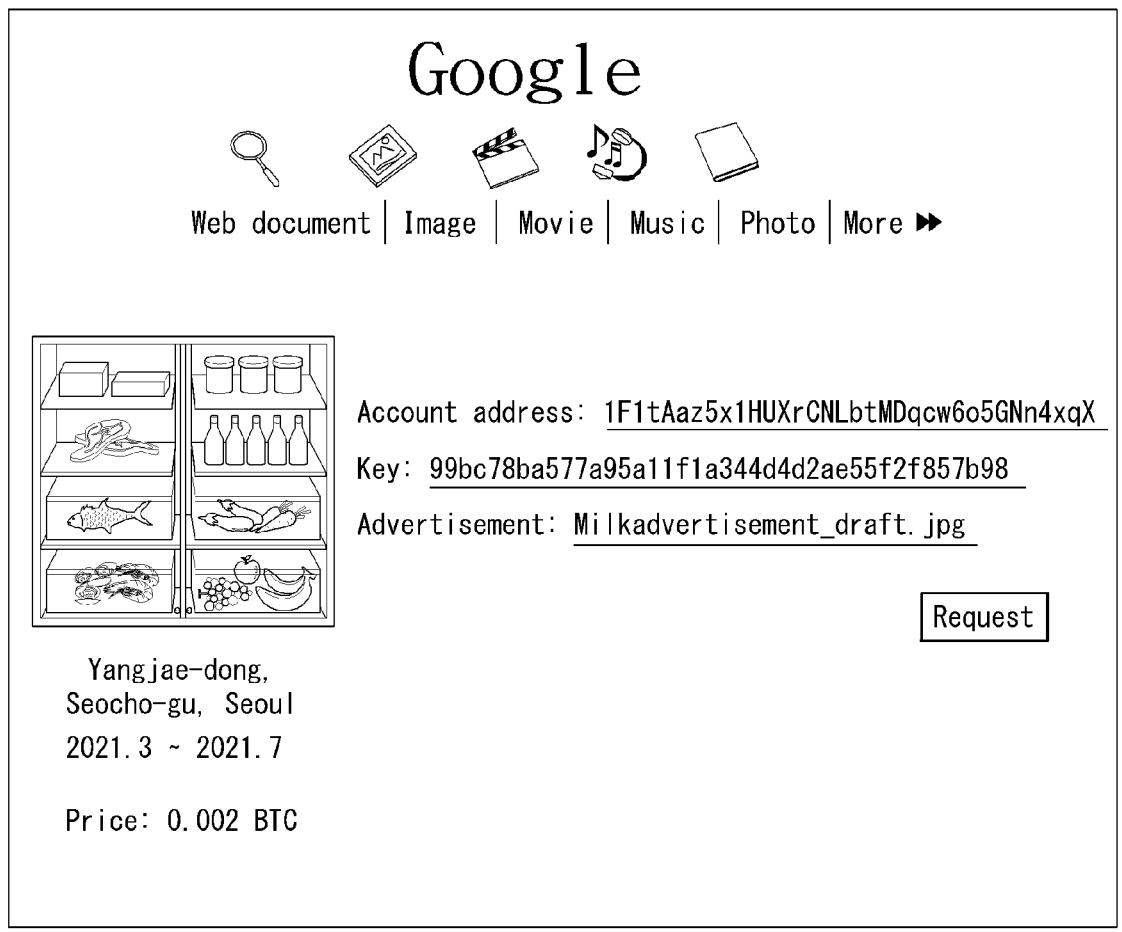

FIGS. 16 to 18 are diagrams for describing a method of selling photograph information of a method for controlling a refrigerator according to an embodiment of the present disclosure.

Referring to FIG. 16 to FIG. 18, a cloud may display the transmitted storage information of the food material by sorting the storage information for each user, and when the displayed storage information of the food material is sold, transmit a sales profit money for the storage information of the food material to the refrigerator.

The cloud may store a plurality types of photograph information transmitted from a pre-registered intelligent refrigerator. The cloud may match user information transmitted together with the photograph information with the photograph information. The photograph information may include photographed images photographing an inside of the refrigerator for a predetermined period.

The cloud may classify the stored photograph information according to a predetermined criterion and upload it on a web site and display it. The predetermined criterion may be a residence, a gender, an age, a marriage state, an interest, and the like. For example, the cloud may display the photograph information such that a purchaser may purchase the photograph information by using the web site.

As shown in FIG. 16, the purchaser may access to the web site and search various photographed images by inputting a search condition. For example, in the case that the purchaser accessed to the web site selects a residence and an interest among the search conditions and input a cooking in the interest, the cloud may search the corresponding various types of information and display it.

As shown in FIG. 17, in the case that the purchaser clicks one of the displayed various types of information, the purchaser may recognize or identify a photographed image photographed during a predetermined period, a price of the photographed image, brief information for the user that photographs the photographed image and an account address.

For example, the price of the photographed image may be displayed with a currency of nations such as Won, Doller, Euro, Yen, and the like or a cryptocurrency (e.g., bitcoin).

The purchaser may select one of various payment methods. For example, the purchaser may pay by selecting one of cash/credit card, point, virtual money (utilizing merits such as low commission of blockchain, M2M payment and payment without intermediator.

The purchaser may purchase the selected photographed image after payment. The purchaser may purchase the photographed image by selecting a wanted photographed image and paying a money. In this case, among the payed money, a commission may be paid to a refrigerator manufacturer, and the remaining money may be paid to a refrigerator owner.

As shown in FIG. 18, the cloud may learn based on the photographed image and may search an advertisement corresponding to related information generated according to the learning result.

In the case that the purchaser requests or displays the searched advertisement, the cloud may save an advertisement cost. The saved advertisement cost may be paid to the refrigerator manufacturer, and a part of it may be paid to the refrigerator owner. The saved advertisement cost may be paid in real time or paid in a predetermined time interval.

Figure 19:
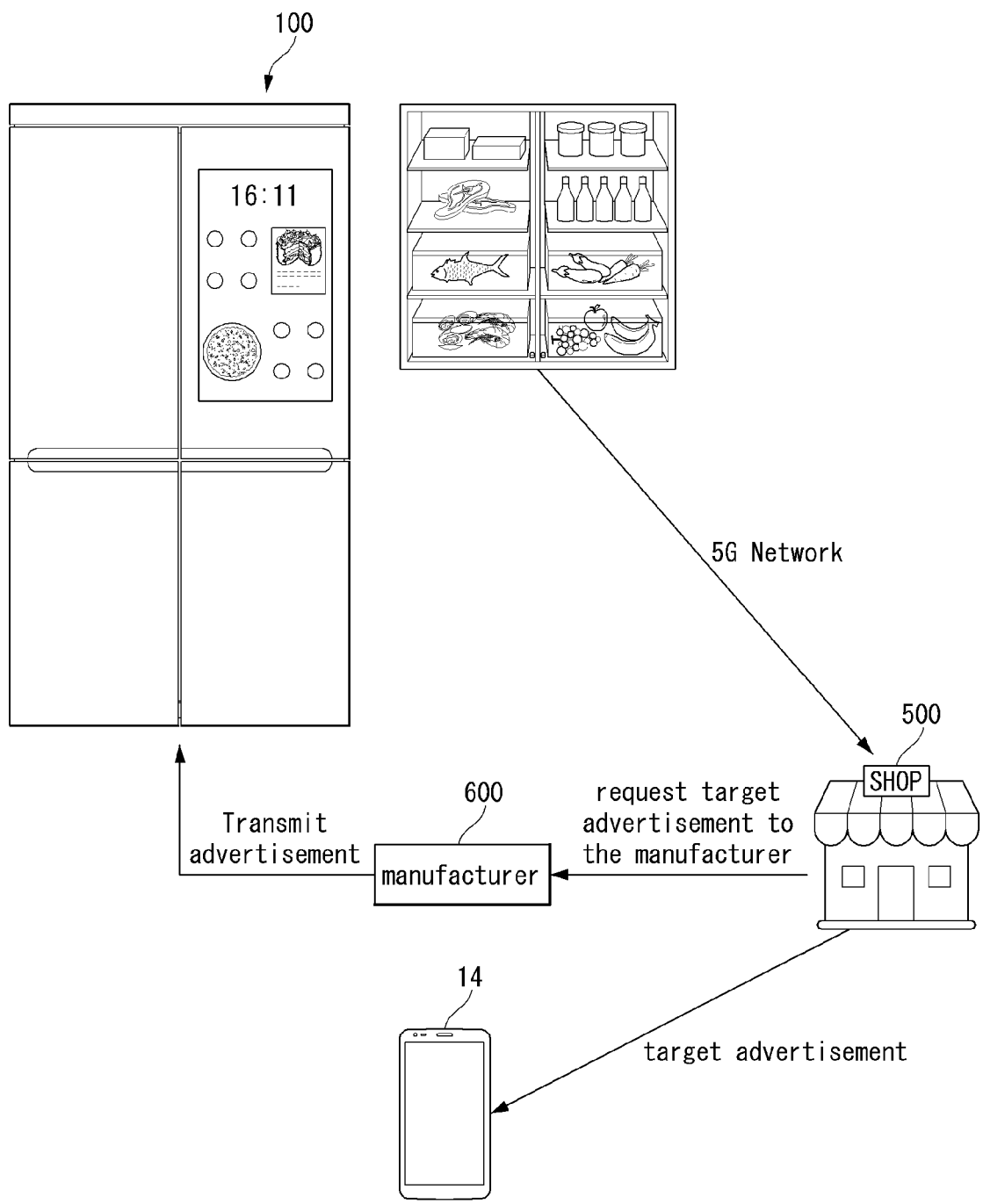
FIG. 19 is a diagram for describing a method of purchasing a product by using a method for controlling a refrigerator according to an embodiment of the present disclosure.

FIG. 19 is a diagram for describing a method of purchasing a product by using a method for controlling a refrigerator according to an embodiment of the present disclosure.

Referring to FIG. 19, the intelligent refrigerator 100 may determine whether to transmit the stock information. In the case that the intelligent refrigerator 100 determines the food material is in stock state under a control of the processor, the intelligent refrigerator 100 may control to transmit the stock information to at least one of: the cloud 10, a preconfigured smart device 14 or a server.

When the stock information is transmitted, the cloud 10 may extract stock feature values from the stock information to determine various types of product information related to the food material based on the stock information.

The stock feature values is determined to be values that particularly distinguish whether the food material is in stock among at least one features that may be extracted from the storage information.

The cloud 10 may select or determine a product preferred by a user by considering the extracted stock feature values and an eating habit of the user. The cloud 10 may control to purchase the selected or determined product by using an online market site or offline mart 500 and deliver the purchase product to the home of the user or a place desired by the user.

In addition, in the case that the food material is in stock, the intelligent refrigerator 100 may transmit the stock information to the preconfigured smart device 14. The user may identify the stock information transmitted through the smart device 14 and may purchase the related product directly or request a purchase of the product to the cloud 10.

Furthermore, the online market site or offline mart 500 may purchase the photograph information from the intelligent refrigerator 100 or the cloud 10 and request a target advertisement to a refrigerator manufacturer 600 by using the purchased photograph information. The online market site or offline mart 500 may transmit the target advertisement to the smart device 14 of the user by using the purchased photograph information.

The refrigerator manufacturer 600 may be connected to the intelligent refrigerator 100 via a 5G network. When the target advertisement is requested, the refrigerator manufacturer 600 transmit the advertisement by extracting or selecting the intelligent refrigerator 100 related to the target advertisement.

The online market site or offline mart 500 may pay an advertisement cost to the refrigerator manufacturer 600. The refrigerator manufacturer 600 may pay a part of the advertisement cost to the refrigerator owner that displays the target advertisement.

Figure 20:
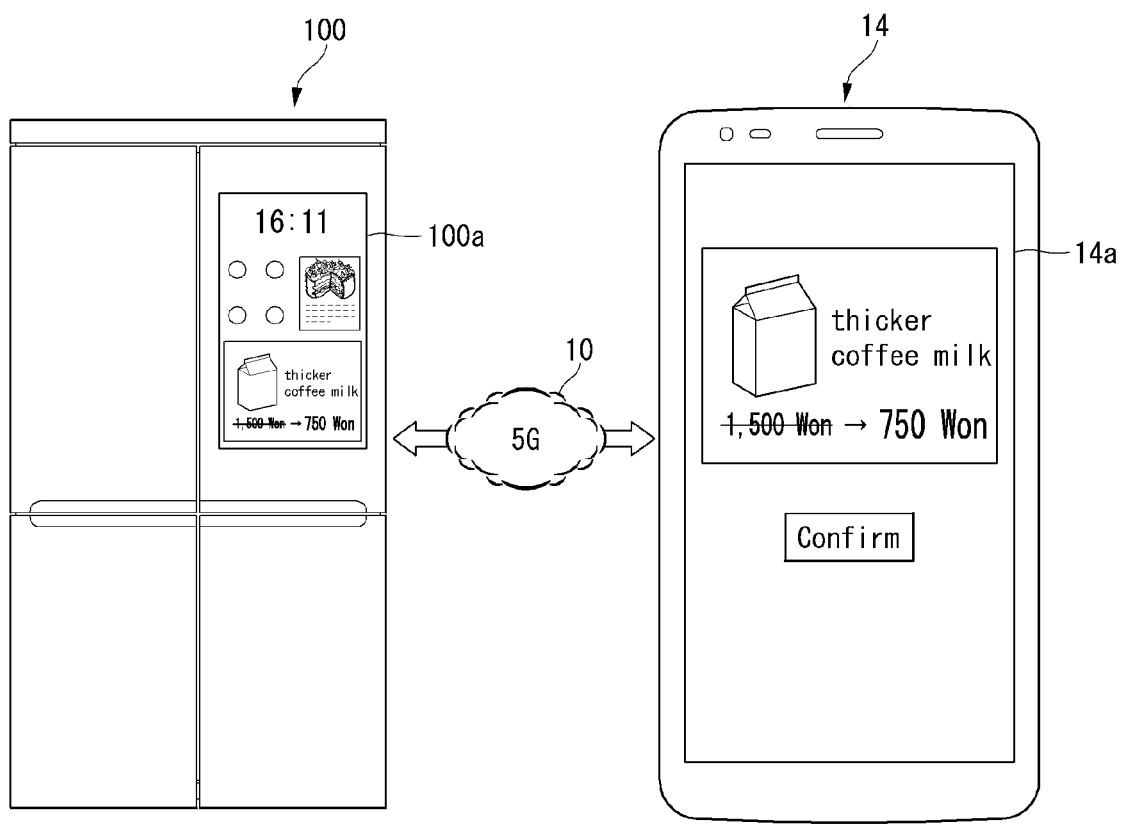
FIG. 20 is a diagram for describing an example of providing an advertisement by using a method for controlling a refrigerator according to an embodiment of the present disclosure.

FIG. 20 is a diagram for describing an example of providing an advertisement by using a method for controlling a refrigerator according to an embodiment of the present disclosure.

As shown in FIG. 20, the intelligent refrigerator 100 or the smart device 14 may be provided with an advertisement corresponding to the stock information from the cloud or the server.

The intelligent refrigerator 100 may display the advertisement in the installed display part 100a, and the smart device 14 may display the advertisement on a touch screen 14a.

When the stock information is transmitted, in order to determine various types of product information related to the food material based on the stock information, the cloud 10 may extract stock feature values from the stock information and transmit advertisement information for a product preferred by a user considering the extracted stock feature values and the eating habit of the user.

The advertisement information may include information for a discount of the product, a discount ticket for the product, information for a similar product related to the product, information for a new product related to the product, and the like.

In addition, the cloud 10 may count a time for the advertisement being displayed in the intelligent refrigerator 100. The cloud 10 may check the counted advertisement time, and based on it, may estimate an advertisement profit money. The cloud 10 may transmit a part of the advertisement profit money to the intelligent refrigerator 100. The present disclosure is not limited thereto, but the intelligent refrigerator 100 may count the time for the advertisement being displayed and may transmit the counted advertisement time information to the cloud 10.

Figure 21:
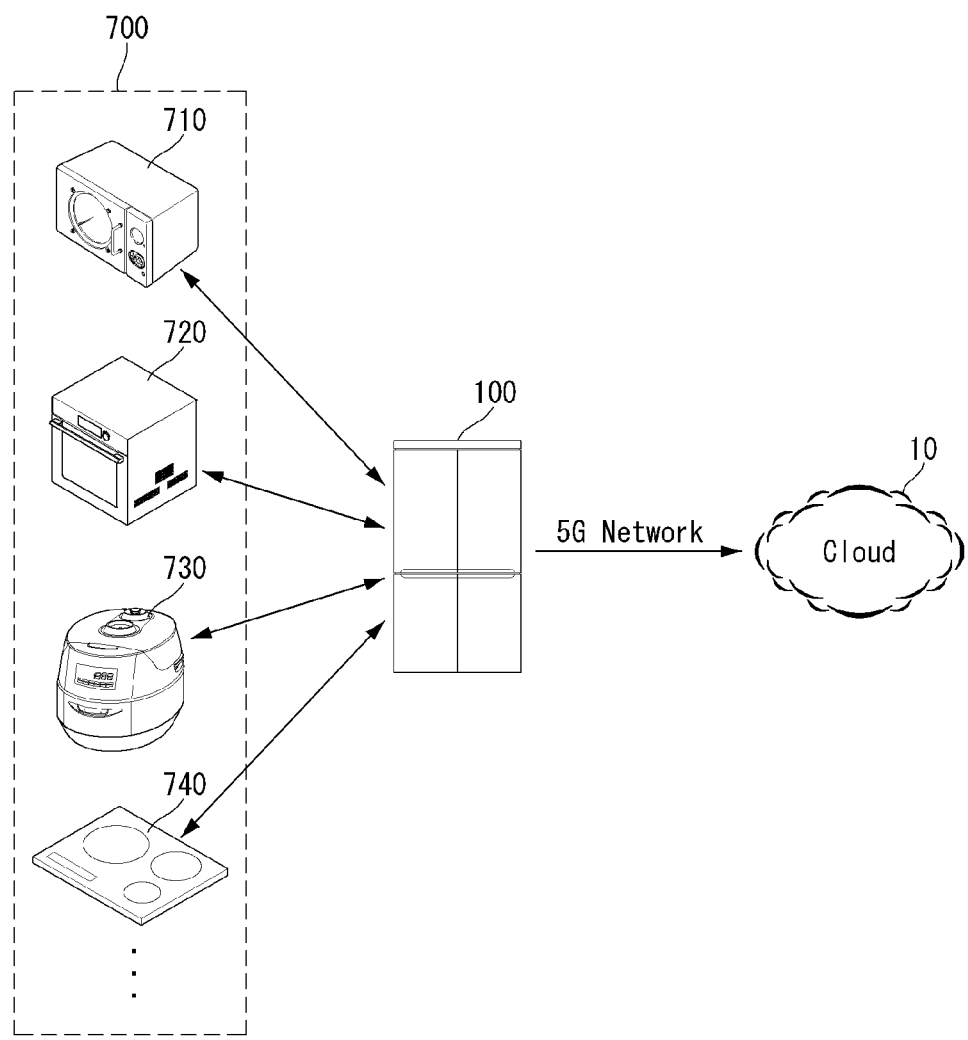
FIG. 21 is a diagram for describing a method for controlling a refrigerator according to another embodiment of the present disclosure.

FIG. 21 is a diagram for describing a method for controlling a refrigerator according to another embodiment of the present disclosure.

Referring to FIG. 21, the intelligent refrigerator 100 may be connected to various home appliance devices 700 located around and transmit data to the home appliance devices 700 or receive data from the home appliance devices 700. The home appliance devices 700 may include a cam or a camera installed in a house, a microwave 710, an oven 720, an air fryer 730, an induction 740, a highlight, including a refrigerator.

The home appliance devices 700 may be mounted with at least one photographing sensor.

The intelligent refrigerator 100 may receive a food image photographed through the home appliance devices 700. Or, the intelligent refrigerator 100 may receive a food image photographed through one or more cameras disposed in a periphery of the home appliance devices 700.

The photographed food image may be referred to as a recipe image. It is described as the photographed food image, but the present disclosure is not limited thereto, but may also be a food video image or a recipe video image.

For example, the air fryer 730 may photograph various foods cooked by the air fryer 730 by using the photographing sensor and generate a recipe image. The air fryer 730 may transmit the generated recipe image to the intelligent refrigerator.

The intelligent refrigerator 100 may classify the recipe images according to each of the home appliance devices and may store it.

The intelligent refrigerator 100 may transmit the recipe image received from the air fryer 730 to the cloud 10 together with user information. The cloud 10 may match the transmitted recipe image to the user information and display the matched recipe image and the user information. Since the detailed description therefor may be sufficiently inferred through FIG. 6 to FIG. 20, the description is omitted.

As described so far, according to the artificial intelligence computing device and a method for controlling a refrigerator using the same according to an embodiment of the present disclosure, a food material stored inside of the refrigerator is photographed, the photographed image is transmitted to a cloud, and a profit can be obtained by selling it. For example, the photographed image may be sold to public/private health service and may be utilized. Using the photographed image sold to the public/private health service, a correlation between the eating habit of a person and health may be researched by utilizing big data and artificial intelligence.

Furthermore, according to the artificial intelligence computing device and a method for controlling a refrigerator using the same according to an embodiment of the present disclosure, using the photographed image, a consumption habit of a user can be accurately identified and easily utilized for a business.

Furthermore, according to the artificial intelligence computing device and a method for controlling a refrigerator using the same according to an embodiment of the present disclosure, a consumed food may be tracked or predicted by using the photographed image, this is utilized for target marketing, and efficiency for food distribution can be improved.

Furthermore, according to the artificial intelligence computing device and a method for controlling a refrigerator using the same according to an embodiment of the present disclosure, a food material stored inside of the refrigerator is photographed, data for identifying a personal eating habit is smoothly provided by using the photographed image, the personal eating habit can be induced to a healthy eating habit, and accordingly, it contributes for human life extension.

Furthermore, according to the artificial intelligence computing device and a method for controlling a refrigerator using the same according to an embodiment of the present disclosure, a profit caused by data generation/providing is shared with a refrigerator owner, and the profit can be generated to the refrigerator owner only if possessing it. Accordingly, a probability of data providing approval is significantly increased, and a consumption habit for a food or an eating habit of a person can be more accurately identified.

Furthermore, according to the artificial intelligence computing device and a method for controlling a refrigerator using the same according to an embodiment of the present disclosure, a refrigerator manufacturer can create additional service profit by using data sales commission and target advertisement, and a food distributor can do very accurate target marketing based on the photographed image.

The above-described present disclosure can be implemented with computer-readable code in a computer-readable medium in which program has been recorded. The computer-readable medium may include all kinds of recording devices capable of storing data readable by a computer system. Examples of the computer-readable medium may include a hard disk drive (HDD), a solid state disk (SSD), a silicon disk drive (SDD), a ROM, a RAM, a CD-ROM, magnetic tapes, floppy disks, optical data storage devices, and the like and also include such a carrier-wave type implementation (for example, transmission over the Internet). Therefore, the above embodiments are to be construed in all aspects as illustrative and not restrictive. The scope of the invention should be determined by the appended claims and their legal equivalents, not by the above description, and all changes coming within the meaning and equivalency range of the appended claims are intended to be embraced therein.

The technical effects of the artificial intelligence computing device and a method for controlling a refrigerator using the same according to an embodiment of the present disclosure are described as below.

According to the artificial intelligence computing device and a method for controlling a refrigerator using the same according to an embodiment of the present disclosure, a food material stored inside of the refrigerator is photographed, the photographed image is transmitted to a cloud, and a profit can be obtained by selling it.

Furthermore, according to the artificial intelligence computing device and a method for controlling a refrigerator using the same according to an embodiment of the present disclosure, the photographed image is sold to public/private health service, big data and artificial intelligence of the photographed image are utilized as a research material such as a correlation between the eating habit of a person and health.

Furthermore, according to the artificial intelligence computing device and a method for controlling a refrigerator using the same according to an embodiment of the present disclosure, using the photographed image, a consumption habit of a user can be accurately identified and easily utilized for a business.

Furthermore, according to the artificial intelligence computing device and a method for controlling a refrigerator using the same according to an embodiment of the present disclosure, a consumed food may be tracked or predicted by using the photographed image, this is utilized for target marketing, and efficiency for food distribution can be improved.

Furthermore, according to the artificial intelligence computing device and a method for controlling a refrigerator using the same according to an embodiment of the present disclosure, a food material stored inside of the refrigerator is photographed, data for identifying a personal eating habit is smoothly provided by using the photographed image, the personal eating habit can be induced to a healthy eating habit, and accordingly, it contributes for human life extension.

Furthermore, according to the artificial intelligence computing device and a method for controlling a refrigerator using the same according to an embodiment of the present disclosure, a profit caused by data generation/providing is shared with a refrigerator owner, and the profit can be generated to the refrigerator owner only if possessing it. Accordingly, a probability of data providing approval is significantly increased, and a consumption habit for a food or an eating habit of a person can be more accurately identified.

Furthermore, according to the artificial intelligence computing device and a method for controlling a refrigerator using the same according to an embodiment of the present disclosure, a refrigerator manufacturer can create additional service profit by using data sales commission and target advertisement, and a food distributor can do very accurate target marketing based on the photographed image.

What is claimed is:

1. A method for controlling a refrigerator, the method comprising:
    capturing an image of food stored inside of the refrigerator;
    comparing the captured image with a preconfigured image, wherein the captured image corresponds to a current frame and the preconfigured image corresponds to a previous frame with respect to the current frame;
    transmitting storage information of the food to a cloud network according to a comparison result;
    learning the transmitted storage information of the food;
    determining a stock state of the food based on the storage information of the food; and
    transmitting a stock information of a deficient food depending on the determined stock state; and
    receiving a message including an advertisement corresponding to the deficient food,
    wherein the stock information of the food is transmitted to at least one of the cloud network, a preconfigured smart device or a server depending on the determined stock state, and
    wherein the refrigerator receives an estimated advertisement cost from the cloud network or the server according to a time when an advertisement message is displayed on the refrigerator.

2. The method of claim 1, wherein information corresponding to a user of the refrigerator is stored or modified before capturing the image of the food.

3. The method of claim 1, wherein capturing the image of the food includes:
    partitioning an interior of the refrigerator into at least one area;
    capturing images of each of the partitioned at least one area; and
    synthesizing each of the captured images of the partitioned at least one area into a single image.

4. The method of claim 3, wherein transmitting the storage information of the food includes obtaining the storage information of the food based on a determination that the preconfigured image is different from the captured image.

5. The method of claim 1, wherein the cloud network is configured to:
    analyze personal storage information for each user for displaying the transmitted storage information of the food, and transmit a value for the storage information of the food to the refrigerator based on a determination that the displayed storage information of the food is sold.

6. The method of claim 1, wherein determining the stock state of the food includes:
   extracting feature values from the learned transmitted storage information;
   inputting the extracted feature values in an artificial neural network (ANN) to identify the stock state of the food; and
   determining the stock state of the food based on an output of the ANN.

7. The method of claim 6, wherein the feature values are values that distinguish the stock state of the food.

8. The method of claim 1, wherein the storage information of the food includes at least one of a motion count of the food, a change of amount for the food, a storage period for the food, a category of the food, or a package of the food.

9. The method of claim 1, further comprising receiving Downlink Control Information (DCI) used for scheduling a transmission of the storage information of the food obtained from a camera from a network, wherein the storage information of the food is transmitted to the network based on the DCI.

10. The method of claim 9, further comprising performing an initial access process with the network based on a Synchronization signal block (SSB),
   wherein the storage information of the food is transmitted to the network through a physical uplink shared channel (PUSCH), and
   wherein the SSB and a demodulation reference signal (DM-RS) of the PUSCH are quasi co-located (QCL) with respect to QCL type D.

11. The method of claim 9, further comprising:
   controlling a transceiver to transmit the storage information of the food to an artificial intelligence (AI) processor included in the network; and
   controlling the transceiver to receive AI processed information from the AI processor, wherein the received AI processed information corresponds to information for determining the stock state of the food.

12. An artificially intelligent computing device for controlling a refrigerator, comprising:
   a camera provided in the refrigerator;
   a processor; and
   a memory for storing a command executable by the processor,
   wherein the processor controls the refrigerator to:
   capture an image of food stored inside of the refrigerator by controlling the camera;
   compare the captured image with a preconfigured previous image, wherein the captured image corresponds to a current frame and the preconfigured image corresponds to a previous frame with respect to the current frame, and
   transmit storage information of the food to a cloud network or a server according to a comparison result;
   learn the transmitted storage information of the food;
   determine a stock state of the food based on the storage information of the food;
   transmit a stock information of a deficient food depending on the determined stock state; and
   receive a message including an advertisement corresponding to the deficient food from the cloud network or the server,
   wherein the stock information of the food is transmitted to at least one of the cloud network, a preconfigured smart device or a server depending on the determined stock state, and
   wherein the refrigerator receives an estimated advertisement cost from the cloud network or the server according to a time when an advertisement message is displayed on the refrigerator.

13. The artificially intelligent computing device of claim 12, wherein capturing the image of food includes:
   partitioning an interior of the refrigerator into at least one area,
   capturing images of each of the partitioned at least one area; and
   synthesize each of the captured images of the partitioned at least one area into a single image.

14. The artificially intelligent computing device of claim 13, wherein the processor is further configured to:
   obtain the storage information of the food based on a determination that the preconfigured image is different from the captured image; and
   transmit the obtained storage information of the food to the cloud network.

15. The artificially intelligent computing device of claim 12, wherein the cloud network is further configured to:
   display the transmitted storage information of the food by analyzing personal storage information for each user, and
   receive a value for the storage information of the food to the refrigerator based on a determination that the displayed storage information of the food is sold.

16. The artificially intelligent computing device of claim 12, wherein the processor is further configured to:
   extract feature values from the learned transmitted storage information, wherein the feature values are values that distinguish the stock state of the food,
   input the extracted feature values in an artificial neural network (ANN) to identify the stock state of the food, and
   determine the stock state of the food based on an output of the ANN.

17. The artificially intelligent computing device of claim 12, wherein the storage information of the food includes at least one of a motion count of the food, a change of amount for the food, a storage period for the food, a category of the food, or a package of the food.

* * * * *